(12) United States Patent
Wakabayashi et al.

(10) Patent No.: US 7,949,896 B2
(45) Date of Patent: May 24, 2011

(54) DEVICE FOR CONTROL OF SWITCHING OF STORAGE SYSTEM

(75) Inventors: Shunichi Wakabayashi, Ninomiya (JP); Kosuke Sakai, Isehara (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 12/276,634

(22) Filed: Nov. 24, 2008

(65) Prior Publication Data

US 2010/0082923 A1 Apr. 1, 2010

(30) Foreign Application Priority Data

Sep. 26, 2008 (JP) ................................. 2008-248428

(51) Int. Cl.
G06F 11/00 (2006.01)
(52) U.S. Cl. ................................ 714/7; 714/6
(58) Field of Classification Search .................... 714/6.7
See application file for complete search history.

(56) References Cited

U.S. PATENT DOCUMENTS

| | | | | |
|---|---|---|---|---|
| 5,727,144 A * | 3/1998 | Brady et al. | ....................... | 714/6 |
| 6,167,531 A * | 12/2000 | Sliwinski | ....................... | 714/13 |
| 6,240,486 B1 * | 5/2001 | Ofek et al. | ....................... | 711/112 |
| 6,598,174 B1 * | 7/2003 | Parks et al. | ....................... | 714/6 |
| 7,328,392 B2 * | 2/2008 | Chikusa et al. | ............... | 714/770 |
| 7,525,749 B2 * | 4/2009 | Maejima et al. | ................. | 360/69 |
| 7,574,623 B1 * | 8/2009 | Goel et al. | ....................... | 714/7 |
| 7,587,629 B2 * | 9/2009 | Okamoto et al. | ................. | 714/6 |
| 7,634,685 B2 * | 12/2009 | Henrickson | ....................... | 714/6 |
| 7,707,456 B2 * | 4/2010 | Tanaka et al. | ..................... | 714/6 |
| 2004/0049553 A1 | 3/2004 | Iwamura et al. | | |
| 2005/0022051 A1 * | 1/2005 | Zane et al. | ....................... | 714/6 |
| 2006/0036658 A1 * | 2/2006 | Henrickson | ................... | 707/204 |
| 2008/0091972 A1 | 4/2008 | Tanaka et al. | | |
| 2008/0147934 A1 | 6/2008 | Nonaka et al. | | |
| 2009/0037638 A1 * | 2/2009 | Izuta et al. | .................... | 710/316 |

FOREIGN PATENT DOCUMENTS

JP 2004-102374 4/2004

* cited by examiner

*Primary Examiner* — Marc Duncan
(74) *Attorney, Agent, or Firm* — Antonelli, Terry, Stout & Kraus, LLP.

(57) ABSTRACT

A storage system includes a controller that controls switching from a system before switching to a system after switching. The controller includes a check unit that checks whether a connection between the system before switching and the system after switching is enabled, or not, a determination unit that determines whether switching from the system before switching to the system after switching is enabled, or not, a fail-over information migration unit that migrates fail-over information included in the system before switching to the system after switching, a user data migration unit that migrates user data in the system before switching to the system after switching, and a switching execution unit that enables the system after switching to receive I/O from a host.

15 Claims, 18 Drawing Sheets

FIG. 7

RAID GROUP MANAGEMENT TABLE 71

| RG NUMBER (711) | HDD NUMBER (712) | RAID LEVEL (713) | .. |
|---|---|---|---|
| RG-1 | 0, 1, 2, 3, 4, 5, 6, 7 | 5 | .. |
| RG-2 | 8, 9, 10, 11 | 2 | .. |
| RG-3 | 12, 13, 14, 15, 16, 17, 18, 19 | 2 | .. |
| : | : | : | : |

FIG. 8

LU MANAGEMENT TABLE 72

| LUN (721) | LDEV NUMBER (722) | RG NUMBER (723) | CAPACITY[GB] (724) | STATUS (725) | .. |
|---|---|---|---|---|---|
| LU-1 | LDEV-1 | RG-1 | XXX | COMPLETED | .. |
| LU-2 | LDEV-1 | RG-1 | YYY | NOT | .. |
| LU-3 | LDEV-2 | RG-2 | ZZZ | NOT | .. |
| : | : | : | : | : | : |

FIG. 9

COPY PAIR MANAGEMENT TABLE 73

| PAIR ID | COPY TYPE | PVOL | | | SVOL | | | STATUS |
|---|---|---|---|---|---|---|---|---|
| | | SERIAL | LUN | HOST NAME | SERIAL | LUN | HOST NAME | |
| C0001 | SYNCHRONOUS | 55014 | 0 | Host-1 | 15005 | 0 | Host-1 | COPYING |
| C0002 | ASYNCHRONOUS | 55014 | 1 | Host-2 | 15005 | 1 | Host-2 | COPY COMPLETED |
| C0003 | ASYNCHRONOUS | 55014 | 2 | Host-3 | 15005 | 2 | Host-3 | COPY COMPLETED |
| .. | .. | .. | .. | .. | .. | .. | .. | .. |

731  732  733  734  735

DEVICE FOR CONTROL OF SWITCHING OF STORAGE SYSTEM

CROSS REFERENCES TO RELATED APPLICATIONS

This application relates to and claims priority from Japanese Patent Application No. 2008-248428, filed on Sep. 26, 2008, the entire disclosure of which is incorporated herein by reference.

BACKGROUND OF THE INVENTION

1. Field of the Invention

The present invention relates to a device for control of switching of a storage system.

2. Description of the Background Art

Conventionally, as a method of performing a switching of a storage system, for example, a method has been known that a host reads out data (some system information and user data) migrated from a storage device of a storage system before switching and then writes the read out data in a storage device of the storage system after switching (Patent Document 1)
Patent Document 1: Japanese Patent Application Laid-open No. 2004-102374

SUMMARY OF THE INVENTION

In the above-described switching method, when the storage system before switching is different from the storage system after switching in configurations thereof, a user needs to set system information of the storage system manually. For example, when both the systems are different in the number or capacities of hard disks, a RAID group defined as a set of hard disks or an LU defined related to the RAID group is required to be re-defined. Further, in addition to a logical configuration of the storage device such as the RAID group or the LU or the like, unique information or functions or the like which the storage system has is required to be set. However, it is cumbersome for the user that the user manually sets system information of the storage system after switching.

In addition, typically, during the switching of the storage systems, reception of I/O from a host stops. When the reception of I/O from a host stops, it is inconvenient for the user that use of the storage system necessarily stops.

Consequently, an object of the present invention is to enable a storage system to be switched without requiring a troublesome effort from of a user.

Another object of the present invention is to enable a storage system to be switched without stopping a reception of I/O from a host substantially.

A storage system includes a controller for controlling a switching of storage system from a first storage system to a second storage system. The controller includes a connection check unit configured to check whether or not a connection is possible between the first storage system and the second storage system; a switching-or-not determination unit configured to determine whether or not the switching of the first storage system to the second storage system is possible; a fail-over information migration unit configured to migrate fail-over information included in the first storage system to the second storage system; a user data migration unit configured to migrate the user data memorized in the first user region to the second storage system; and a switching execution unit configured to enable the second storage system to receive I/O from the host.

At least one of the connection check unit, the switching-or-not determination unit, the fail-over information migration unit, the user data migration unit and the switching execution unit described above may be established by a hardware, a computer program or a combination thereof (for example, some are realized by the computer program and others are realized by the hardware). The computer program is read and executed by a predetermined processor. In addition, at the time of information processing when the computer program is read and executed by the processor, a storage region present in the hardware resources such as a memory and the like may be used properly. Moreover, the computer program may be installed to a computer from a recording medium such as a CD-ROM and so on and may be downloaded to a computer over a communication network.

BRIEF DESCRIPTION OF THE DRAWINGS

FIG. 7 is a diagram to illustrate an example of the RAID group management table;

FIG. 8 is a diagram to illustrate an example of the LU management table;

FIG. 9 is a diagram to illustrate an example of the copy pair management table;

DETAILED DESCRIPTION OF THE PREFERRED EMBODIMENTS

Hereinafter, embodiments of the present invention will be described with reference to the accompanying drawings.

Figure 1:
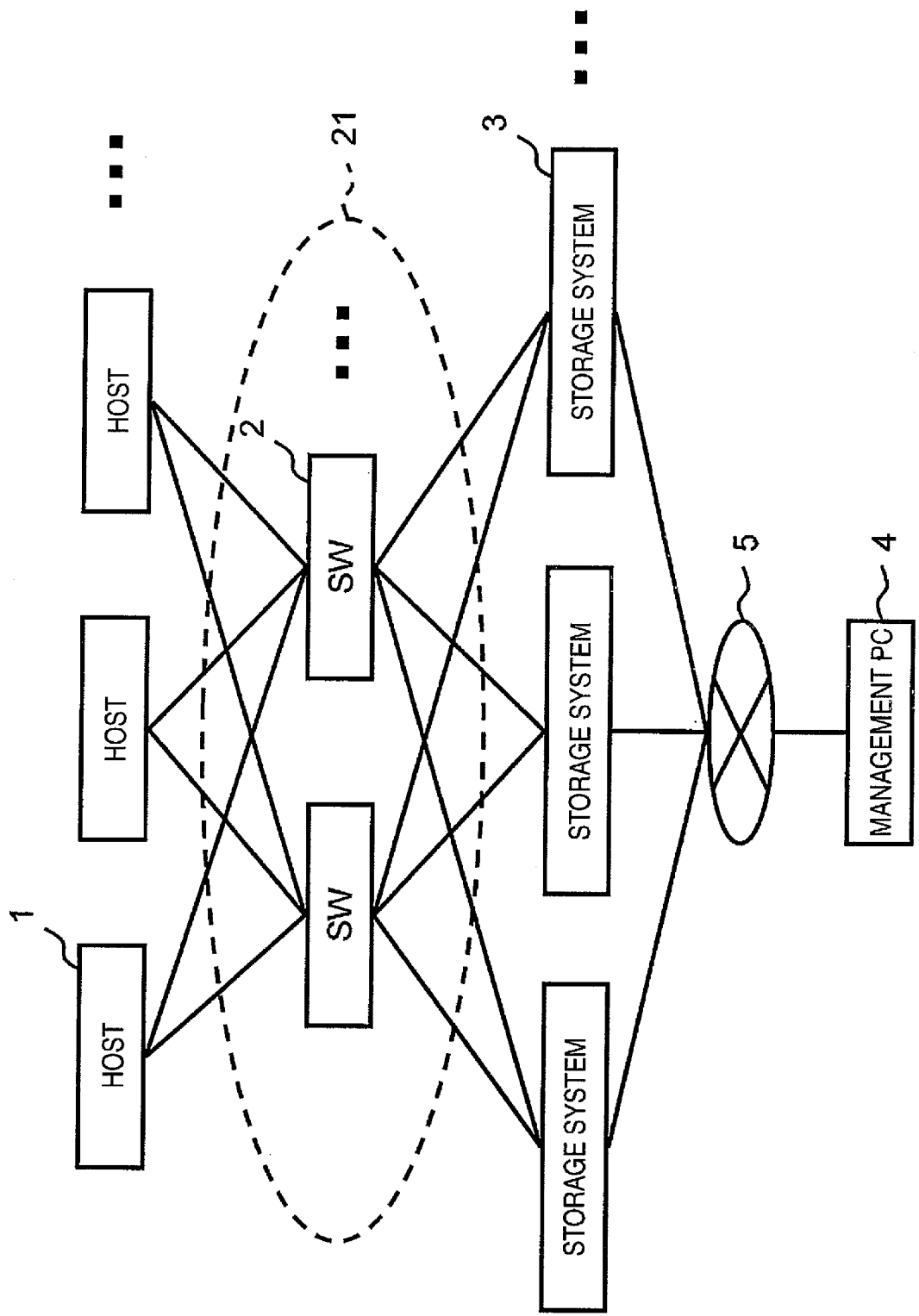
FIG. 1 is a diagram to illustrate an example of a configuration of a computer system related to this embodiment.

FIG. 1 is a diagram to illustrate an example of a configuration of a computer system related to this embodiment.

A host computer (hereinafter, abbreviated to "host") 1 and a storage system 3 are connected via a switch (SW) 2. A data communication between the host 1 and the storage system 3 is performed based on an iSCSI (Internet Small Computer System Interface) protocol. A plurality of hosts 1 and a plurality of storage systems 3 are connected via the one or more switches 2 to form a communication network 21. Although depending on the configuration of the communication network 21 (whether the storage system 3 is connected to which of the SWs 2 or a connection relationship between the SWs 2), a plurality of storage systems 3 are connected to each other via the communication network 21.

Each of a plurality of storage systems 3 is connected to a management PC (personal computer) 4. The storage systems 3 and the management PC 4 are connected via, for example, a LAN (Local Area Network) 5.

Figure 2:
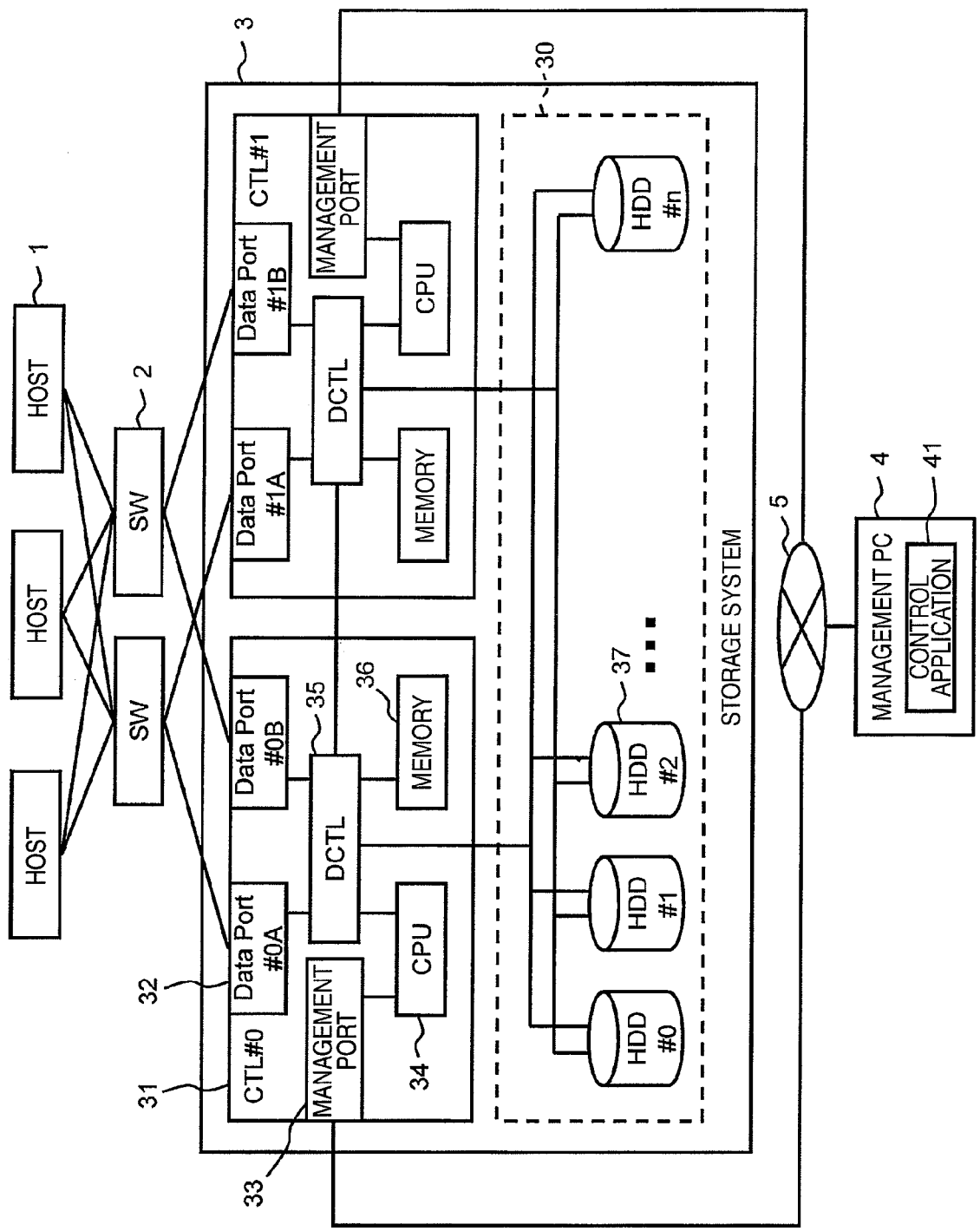
FIG. 2 is a diagram to illustrate an example of a configuration of the storage system related to this embodiment.

FIG. 2 is a diagram to illustrate an example of a configuration of the storage system 3 related to this embodiment.

The storage system 3 is loaded with, for example, duplicated controller devices (CTL) 31 and storage device 30.

The storage device 30 is configured of a gathering of a plurality of hard disk drives (HDDs) 37. The storage device 30 may be configured of other kinds of media drives (for example, flash memory drive) or may be configured of a mixture of plural kinds of media drives, not limited to the HDD 37.

The CTLs 31 are, for example, hardware circuits. The CTL 31 is provided with a plurality of data ports 32 (two in this embodiment), a management port 33, a CPU (Central Processing Unit) 34, a data transfer controller device (DCTL) 35 and a memory 36.

The data ports 32 are an interface for connecting to the host 1 or other storage systems 3. The data ports 32 can receive a variety of commands (a command requesting for writing or reading out data and the like) from the host 1. The data ports 32 to receive a command send the command to the CPU 34.

The management port 33 is an interface for connecting to the management PC 4. The management port 33 can receive a variety of commands (a command of a migration instruction or a command of a switching-execution instruction) from the management PC 4. The management port 33 to receive a command sends the command to the CPU 34.

The DCTL 35 is a device for controlling data transmission among the elements (the CPU 34, the memory 36, the data port 32).

The CPU 34 performs, for example, a processing of commands. In detail, when receiving a command (write command) of requesting for writing of data, the CPU 34 writes data (write data) received together with the write command in a specific region of HDD 37 on the basis of the write command. Describing this more in detail, the CPU 34 first reads system information from the storage device 30 and then stores it in the memory 36 upon start-up. The CPU 34 specifies a HDD 37 and a region thereof which are access targets on the basis of an address (for example, an LUN (Logical Unit Number) or an LBA (Logical Block Address)) designated by the write command, by referring to the system information. The CPU 34 writes the write data in the specified region of the HDD 37. In addition, the write data is temporarily stored in the memory 36 until the CPU 34 writes it in the HDD 37 after reception. When receiving a command (read command) to request for reading data, the CPU 34 reads out a designated data (read data) from a predetermined HDDs 37. The CPU 34 transfers the read data read out from the HDD 37 to the host 1. The read data is temporally stored in the memory 36 until the CPU 34 transfers it to the host 1 after reading it out from the HDD 37. In addition, when receiving a command of a migration instruction, the CPU 34 initiates a switching processing for the storage system 3 (hereinafter, referred to as "switching processing"). The switching processing (that is, a processing which is performed when a command of a migration instruction or a command of a switching-execution instruction is received) will be described later in detail.

The management PC 4 is a computer for controlling the switching of the storage system 3. The management PC 4 includes, for example, a CPU, a memory, an input unit such as a keyboard, a mouse or the like, and an output unit such as a display and the like. In addition, a control application 41 which controls a switching of the storage system 3 is memorized in the memory of the management PC 4. The control application 41 is executed by the CPU of the management PC 4 to control at least one of a system 3A before switching and a system 3B after switching, thereby enabling both the systems 3A and 3B to be switched. In addition, the control application 41 provides a predetermined GUI (Graphical User Interface) to a user and receives a predetermined input from the user such that various settings about a switching of the storage system 3 are performed.

As above, the storage system 3 has been described. The storage system 3 related to this embodiment is the storage system 3 which a user need not manage. Speaking of a feature in terms of configuration, in the storage system 3, the HDDs 37 loaded in advance cannot be inserted or extracted and further the HDDs 37 cannot be changed wholly. Likewise, the components (e.g., the CTL 31) other than the HDDs 37 cannot be changed wholly, either. In addition, other components (for example, CTL 31) except for the HDD 37 are configured to be exchangeable by a component substance. Thus, for example, when an obstacle happens at either CTL 31, the storage system 3 itself is changed to another (that is, the storage system 3 is switched).

Figure 19:
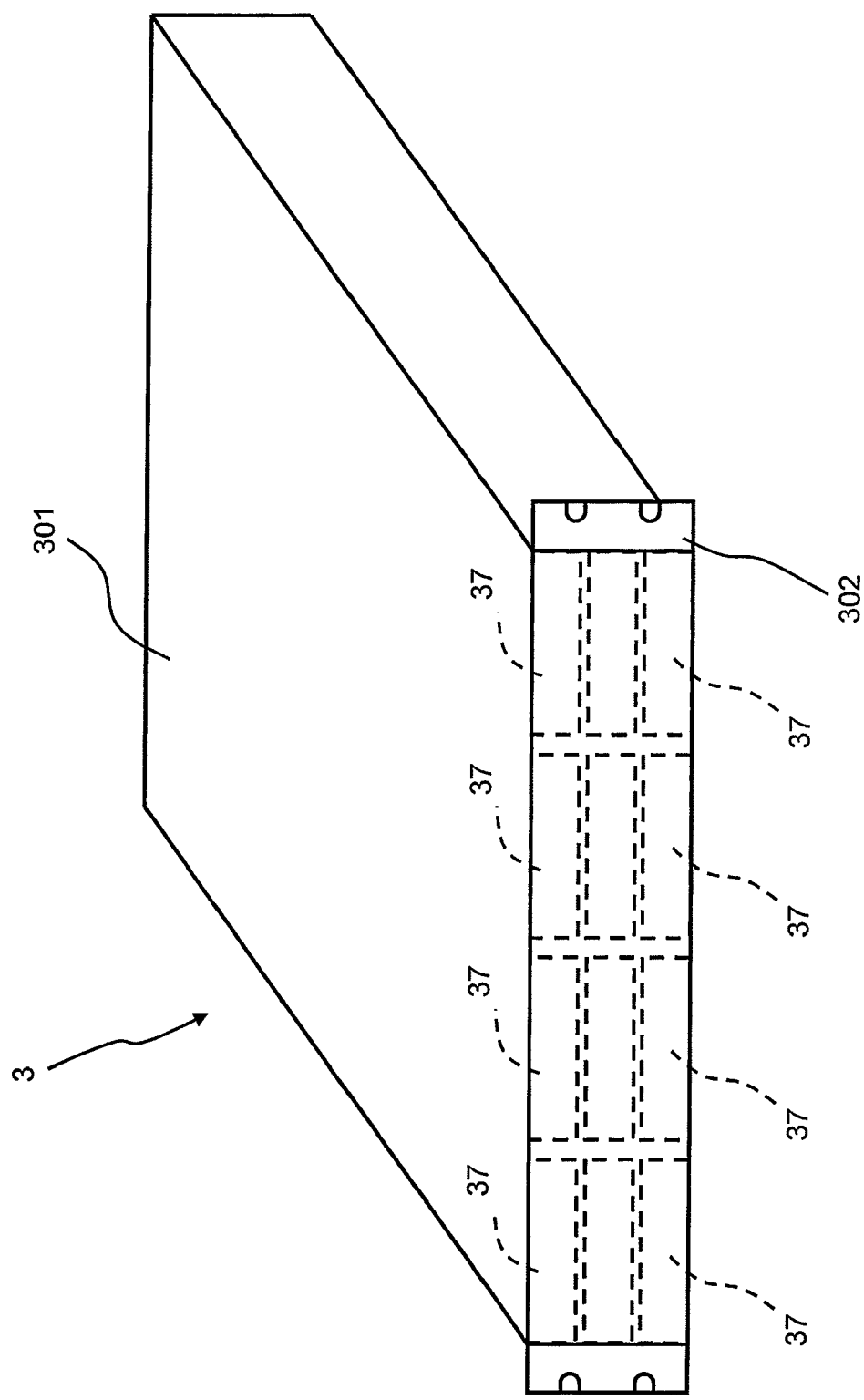
FIG. 19 is a perspective view to illustrate an appearance of the storage system.

For example, FIG. 19 is a perspective view to illustrate an appearance of the storage system 3. The storage system 3 includes, for example, a body 301, a front bezel 302 provided to cover the front side of the body 301, and a plurality of HDDs 37 arranged in a matrix on the front side of the body 301. The HDDs 37 are connected to a not-shown backboard (circuit board). In the rear side of the body 301, the CTL 31, a power supply (not shown), a battery (not shown) and a cooling fan (not shown) are connected to the backboard. The front bezel 302 cannot be divided by a user, for example. In addition, for example, the HDD 37 cannot be extracted by the user. In detail, for example, the division thereof is impossible by a method that the HDDs 37 are arranged in a pitch such that a human's finger cannot enter therein, or by a method that a handle such as one provided in a canister is not provided in the HDDs 37. The storage system 3 is provided with the predetermined number (for example, two) of expansion slots and a removable HDD can be inserted and extracted via the expansion slots. Thereby, it is possible to increase or decrease the number of the HDDs loaded in the storage system 3.

Figure 3:
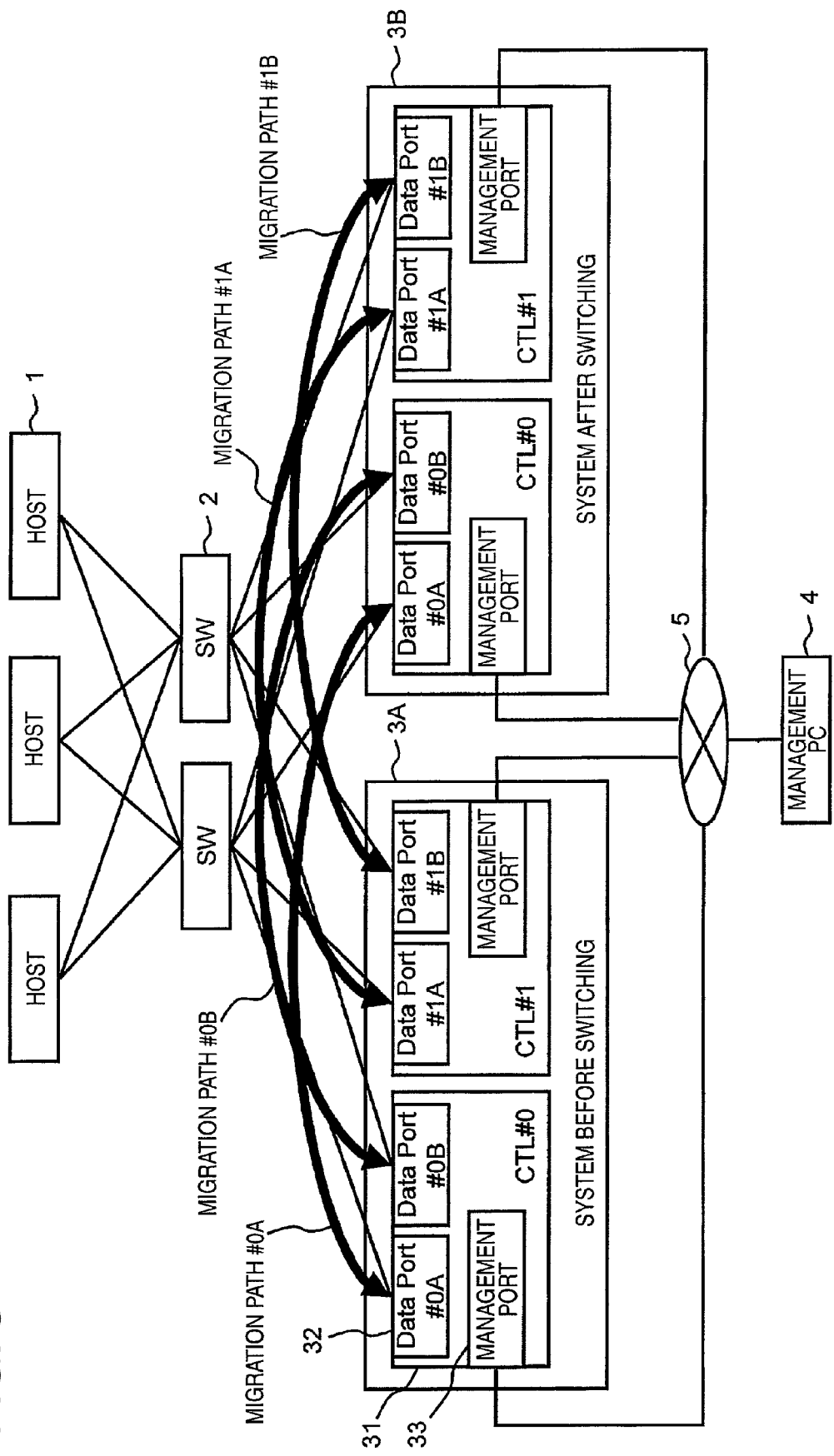
FIG. 3 is a diagram to illustrate a connection relationship between the system 3A before switching and the system 3b after switching.

FIG. 3 is a diagram to illustrate a connection relationship between the system 3A before switching and the system 3B after switching.

In this embodiment, a switching is performed from one of a plurality of storage systems 3 to the other storage system 3. For example, when an operation of a storage system (old storage system) which has been operated till now is stopped and a new storage system (new storage system) to replace the old storage system is intended to be operated, a switching of the storage systems 3 is performed from the old storage system to the new storage system. Hereinafter, a storage system 3 before switching is referred to as "system 3A before switching" and a storage system 3 after switching is referred to as "system 3B after switching."

As shown in FIG. 3, connection between the system 3A before switching and the system 3B after switching is performed by connection of the respective data ports 32 via the SWs 2. Describing in detail, between both the systems 3A and 3B, corresponding (forming a pair) data ports 32 are connected to each other via the SWs 2. In this case, the corresponding data ports 32 refer to data ports 32 of each other having the same data port ID in each of both the systems 3A and 3B. For example, the data port #0A of the system 3A before switching is connected to the data port #0A of the system 3B after switching. Likewise, the data ports #0B, #1A and #1B of the system 3A before switching are connected to the data ports #0B, #1A and #1B of the system B after switching, respectively. In addition, it is a premise condition for a switching processing that the corresponding data ports 32 can be connected (can be communicated) to each other.

Hereinafter, a path created between both the systems 3A and 3B by connection between both the systems 3A and 3B is referred to as "migration path." In the example of FIG. 3, four migration paths (the migration path #0A to mutually connect the data ports #0A, the migration path #0B to mutually connect the data ports #0B, the migration path #1A to mutually connect the data ports #1A, and the migration path #1B to mutually connect the data ports #1B) are created.

The switching processing related to this embodiment has two processing phases. One is a processing phase to migrate user data and some system information (described later). This processing phase is triggered by a migration instruction from a user for initiation. The other is a processing phase to execute a switching of the storage systems 3, that is, to change IDs of the devices or IP addresses of the system 3B after switching into IDs of the devices or IP addresses of the system 3A before switching such that the host 1 can recognize the system 3B after switching (can issue I/O to the system 3B after switching). Such processing phase is triggered by a switching-execution instruction from the user for initiation.

One feature of the switching processing related to this embodiment can perform a switching processing while the system 3A before switching is operating. That is, the system 3A before switching can receive I/O from the host 1 even during performing a switching processing. Correctly speaking, the system 3A before switching does not always receive I/O from the host 1 until the switching processing is completed. However, the switching processing related to this embodiment can make the stop time of reception of I/O from the host 1 very short (for example, 30 seconds or less). Therefore, the switching processing can be substantially performed without stopping of reception of I/O from the host 1.

Another feature of the switching processing related to this embodiment is to enable a user to operate the storage system less (that is, to spare a user of trouble). A user can complete the switching processing by only inputting two instructions (that is, a migration instruction and a switching-execution instruction) to the storage systems 3 via the management PC 4. In other words, the storage systems 3 are triggered by the instructions from a user to automatically perform a configuration of a RAID group or an LU in the system 3B after switching or migration of user data from the system 3A before switching to the system 3B after switching and the like.

Figure 4:
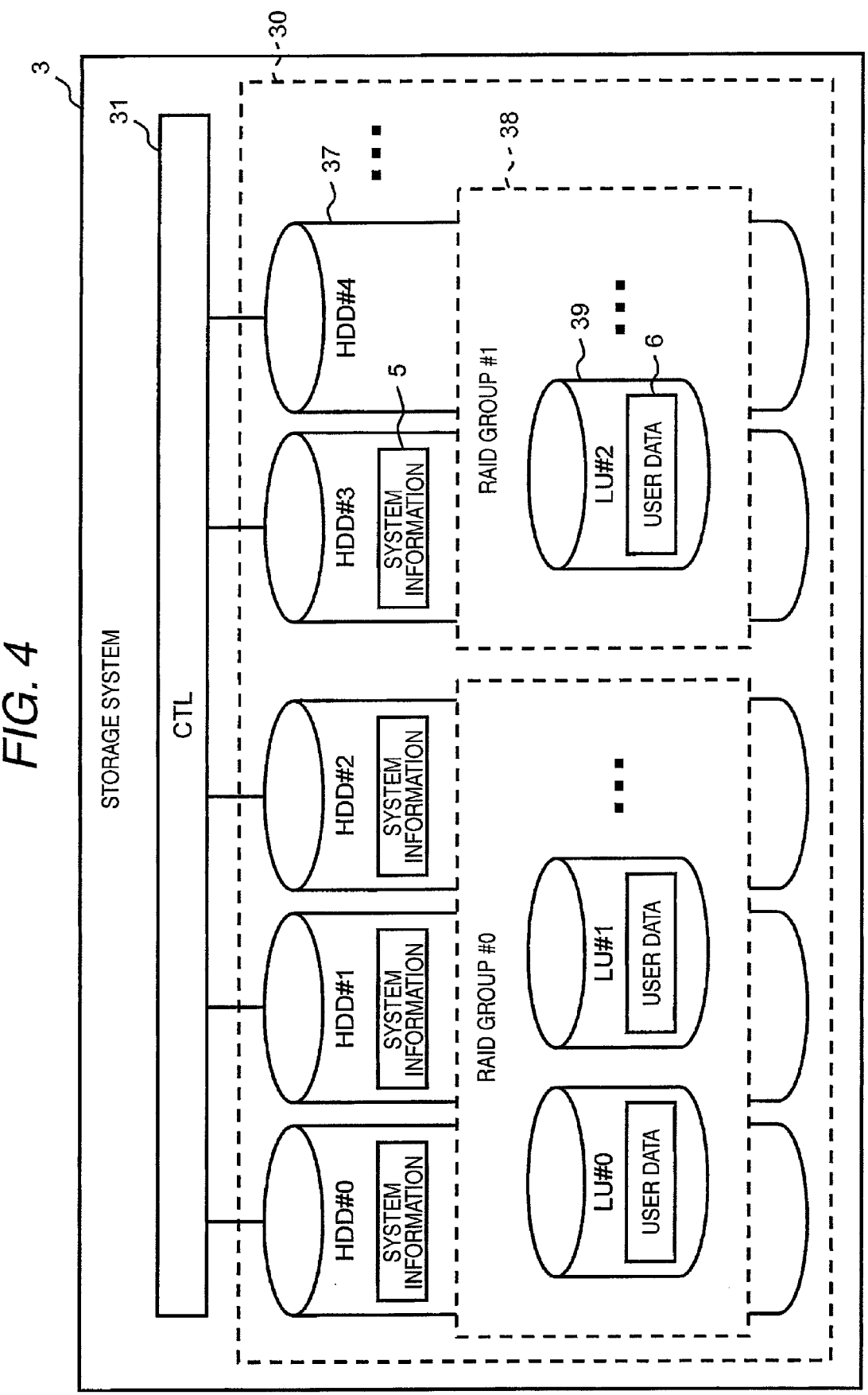
FIG. 4 is a diagram to illustrate an example of configuration of the storage device included in the storage system related to this embodiment.

FIG. 4 is a diagram to illustrate an example of configuration of the storage device 30 included in the storage system 3 related to this embodiment.

As described above, the storage device 30 is configured of a plurality of HDDs 37. System information 5 is stored in a portion of region of several HDDs 37. In this case, the system information 5 refers to information regarding a configuration or a control of the storage system 3. For example, the system information 5 includes information indicative of a physical or logical configuration of the storage system 3, a unique setup value assigned to the storage system 3, a unique function executable by the storage system or a host to be accessed thereby. The system information 5 is memorized in a region other than a region provided to the host 1. The system information 5 will be described later in detail.

In addition, a RAID group 38 is configured of a plurality of HDDs 37. The LUs 39 recognized by the host 1 are configured by assigning a predetermined region included in the RAID group 38. User data 6 is memorized in the LU 39.

Figure 5:
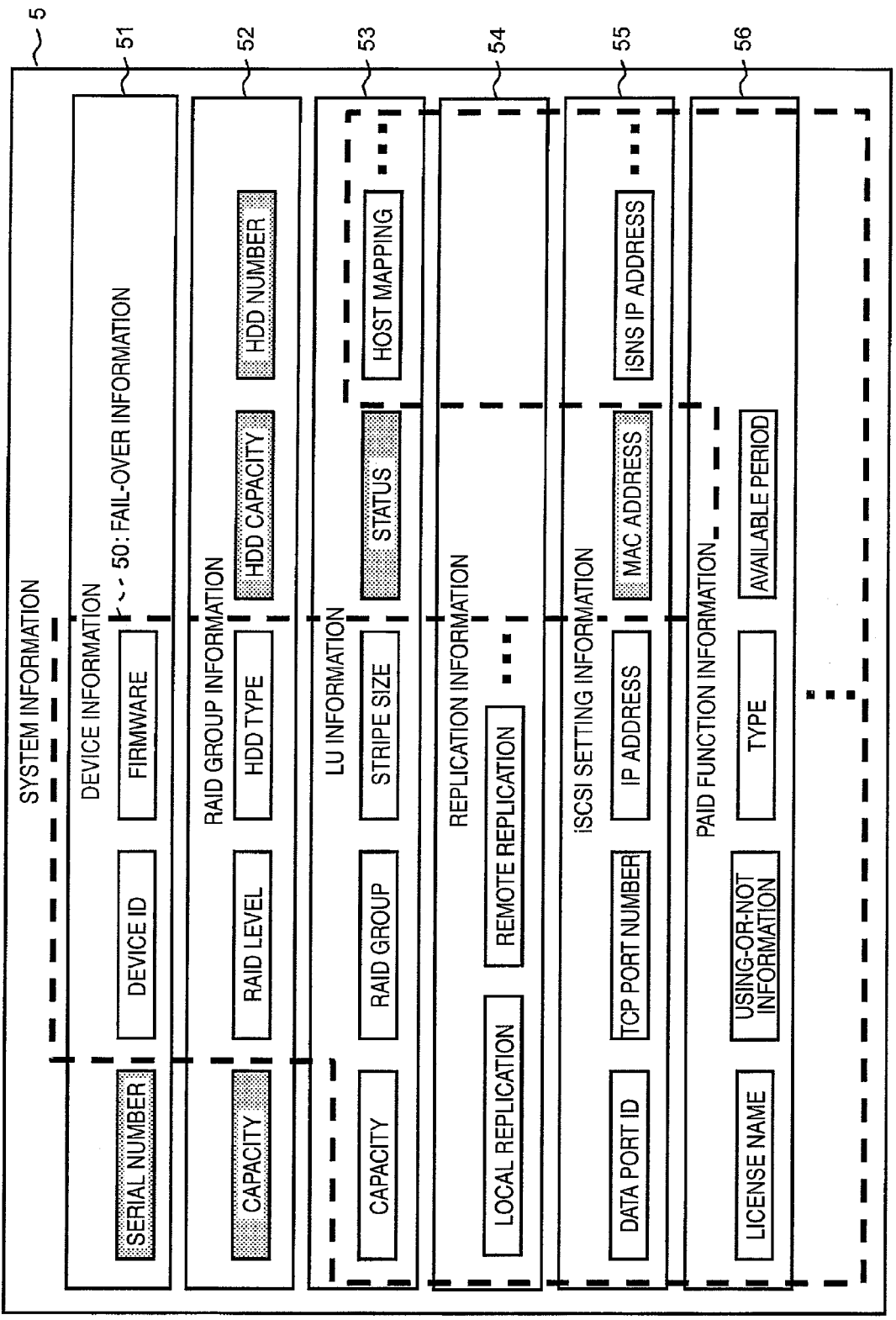
FIG. 5 is a diagram to illustrate an example of the system information.

FIG. 5 is a diagram to illustrate an example of the system information 5.

The system information 5 includes, for example, device information 51, RAID group information 52, LU information 53, replication information 54, iSCSI setting information 55, paid function information 56 or the like.

The device information 51 includes, for example, a serial number of the storage system 3 (hereinafter, referred to as "target system 3" in description of FIG. 5) to maintain the system information 5, a device ID which is information for uniquely specifying the target system 3 and firmware for controlling the target system 3.

The RAID group information 52 is information regarding the RAID group 38 configured in the target system 3. The RAID group information 52 includes, for example, a capacity of the RAID group 38, a RAID level of the RAID group 38, a HDD type of the HDDs 37 configuring the RAID group 38, a HDD capacity of the HDDs 37 configuring the RAID group 38 and a HDD number of the HDDs 37 configuring the RAID group 38, for each of the RAID groups 38 configured in the target system 3. The RAID group information 52 is maintained by, for example, a RAID group management table described later.

The LU information 53 is information regarding the LUs 39 configured in the target system 3. The LU information 53 includes a capacity of the LU 39, the RAID group 38 configuring the LU 39, a stripe size of the LU 39, a status of the LU 39, a host mapping indicative of a connection relationship between the LU 39 and the host 1, and the like, for each of the LUs 39 configured in the target system. The LU information 53 is maintained by, for example, an LU management table described later.

The replication information 54 is information regarding a copy pair created in the target system 3. The replication information 54 includes, for example, a local replication which is information regarding a copy pair created within the target system 3 and a remote replication which is information regarding a copy pair created between the target system 3 and other storage systems 3. The replication information 54 is managed by, for example, a copy pair management table described later.

The iSCSI setting information 55 is information regarding the data ports 32 included in the target system 3. The iSCSI setting information 55 includes, for example, a data port ID which is information for uniquely specifying the data port 32, an IP address assigned to the data port 32 (hereinafter, abbreviated to "IP address"), an MAC address assigned to the data port 32 (hereinafter, abbreviated to "MAC address") and the like, for each of the data ports 32 included in the target system 3.

The paid function information 56 is information regarding paid functions (a function available to only a user to pay a fee) loaded in the target system 3. The paid function information 56 includes, for example, a license name of the paid function, using-or-not information indicative of whether or not the paid function is available, the available period of the paid function and the like, for each of the paid functions loaded in the target system 3. The using-or-not information may use a flag such that the flag is set to "1" in an available status and the flag is set to "0" in an unavailable status.

In the switching processing, the user data 6 and some system information 5 are migrated to the system 3B after switching from the system 3A before switching. For the system information 5, for example, the information 50 surrounded by the wavy line in FIG. 5 (one excluding information colored with a gray) is migrated. Hereinafter, the system information 5 which is a migration target is referred to as "fail-over information 50." A migration method of the user data 6 and the fail-over information 50 will be described later. By migration of the fail-over information 50, the RAID group 38 or the LU 39 having the same configuration as the RAID group 38 or the LU 39 in the system 3A before switching is configured in the system 3B after switching as well.

In the switching processing, the fail-over information 50 is migrated before migration of the user data 6. This is because the LU 39 which is a storing target of the user data 6 is required to be configured before migration of the user data 6. Meanwhile, the device ID and the IP address of the fail-over information 50 are migrated after migration of the user data 6. This is because the device ID and the IP address are migrated as late as possible and thereby the system 3A before switching can receive I/O from the host 1 as long as possible in a process of the switching processing. That is, since the device IDs and the IP addresses should not overlap one another among a plurality of storage systems 3, the device IDs and the ID addresses of both the systems 3A and 3B are exchanged (replaced), or the device ID and the IP address of the system 3A before switching are changed into different values after migration. A destination of I/O from the host 1 is not the system 3A before switching but the system 3B after switching, after replacement. For this reason, the device ID and the IP address are migrated as late as possible.

The firmware of the fail-over information 50 is special in the migration method. In the case of firmware, a version of the firmware of the system 3A before switching and a version of the firmware of the system 3B after switching are compared. If the version of the firmware of the system 3B after switching is lower, the firmware of the system 3A before switching is migrated. That is, the firmware of the system 3B after switching is updated in a version.

Hereinafter, not-fail-over information (the hatched information in FIG. 5) of the system information 5 will be described.

The serial number is a number given for each storage system 3 at the time of manufacturing the same and is not changed. Thus, the serial number is not migrated. Likewise, the MAC address is an address given for each data port 32 at the time of manufacturing the same and is not changed. Thus, the MAC address is not migrated.

The information regarding the HDDs 37 such as the HDD capacity or the HDD number or the like is information indicative of a configuration of the storage device 30 of the storage system 3 and information specialized for the storage system 3. Therefore, the information regarding the HDDs 37 is not migrated. In addition, the capacity of the RAID group 38 is determined based on the capacities of the HDDs 37 configuring the RAID group 38. That is, if the capacities of the HDDs 37 configuring the RAID group 38 in the system 3B after switching are larger than those of the HDDs 37 configuring the RAID group 38 in the system 3A before switching, the capacity of the RAID group 38 in the system 3B after switching becomes larger in respect to the capacities of the HDDs 37 configuring the RAID group 38. Thus, the capacity of the RAID group 38 is not migrated.

Figure 6:
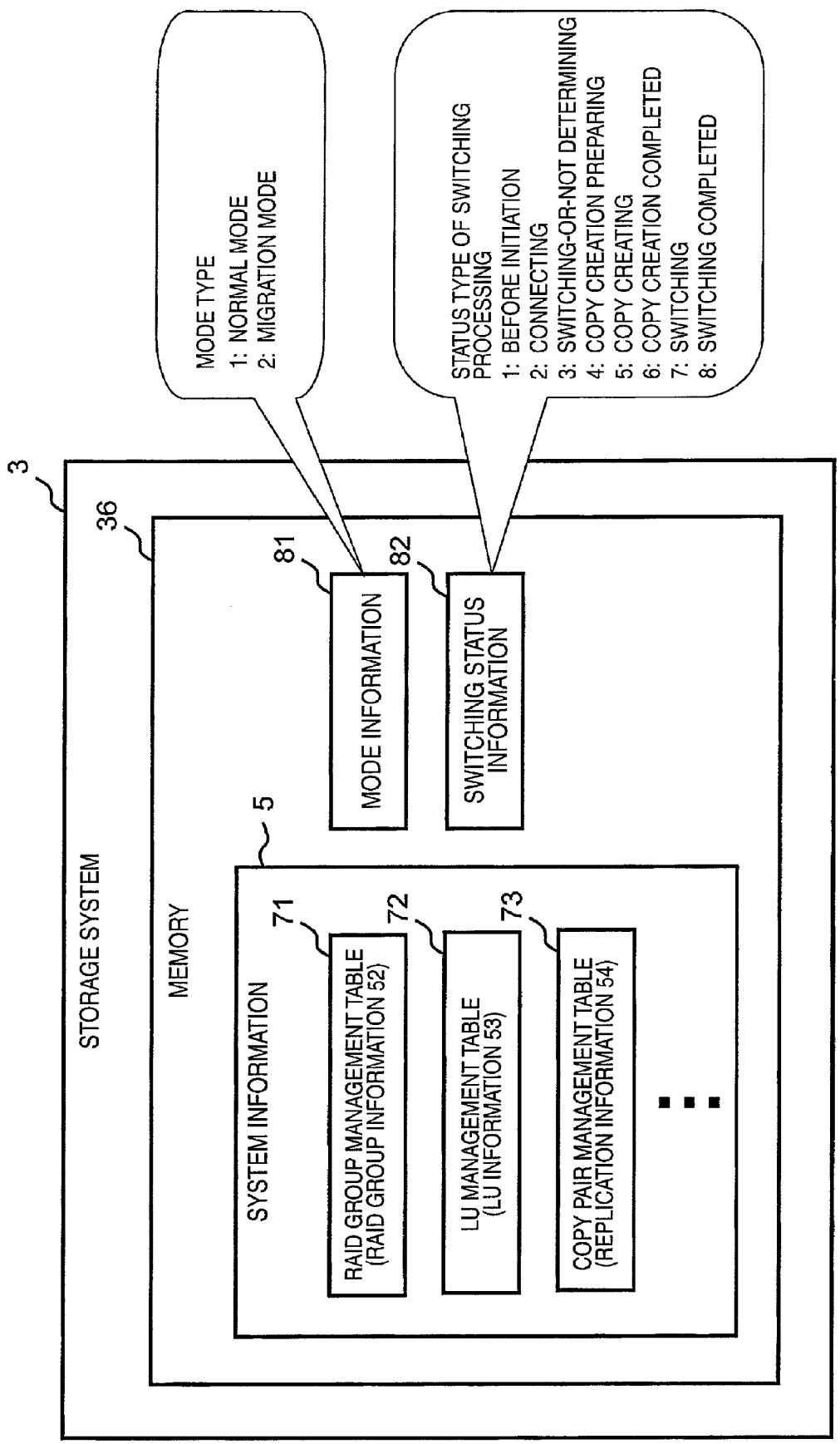
FIG. 6 is a diagram to illustrate an example of information memorized in the memory included in the storage system.

FIG. 6 is a diagram to illustrate an example of information memorized in the memory 36 included in the storage system 3.

The system information 5, For example, is memorized in the memory 36. As described above, the system information 5 is read out from the HDDs 37 to be stored in the memory 36 at the time of start-up. In this embodiment, the RAID group information 52 is maintained by the RAID group management table 71, the LU information 53 is maintained by the LU management table 72, and the replication information 54 is maintained by the copy pair management table 73. These tables 71, 72 and 73 are described later in detail.

In addition to the system information 5, for example, the mode information 81 and the switching status information 82 are memorized in the memory 36. The mode information 81 is information indicative of operation modes of the storage system 3. As the operation modes, there are, for example, "normal mode" and "migration mode." The migration mode is a mode set in the system 3B after switching and a mode indicative of what switching processing is performed. In the migration mode, the storage system cannot receive I/O from the host 1 and cannot use the paid function, either. The system 3B after switching set to the migration mode does not receive manipulation from devices other than the system 3A before switching.

The switching status information 82 is information indicative of a switching processing status in the system 3A before switching. As the switching processing status, there are, for example, "before initiation," "connecting," "switching-or-not determining," "copy creation preparing," "copy creating," "copy creation complete," "switching" and "switching complete."

FIG. 7 is a diagram to illustrate an example of the RAID group management table 71.

The RAID group management table 71 is a table for managing the RAID group information 52. In the RAID group management table 71, for example, the RG (RAID group) number 711, the HDD number 712, the RAID level 713 and the like are recorded, for each RAID group 38. The RG number 711 is information for equally specifying the RAID group 38. The HDD number 712 is the number of HDD 37 for configuring the RAID group 38 (hereinafter, "corresponding RAID group 38") to be specified by the corresponding RG number 711. The RAID level 713 is an RAID level of the corresponding RAID group 38.

FIG. 8 is a diagram to illustrate an example of the LU management table 72.

The LU management table 72 is a table for managing the LU information 53. In the LU management table 72, for each LU 39, for example, the LUN (Logical Unit Number) 721, the LDEV (Logical Device) number 722, the RG number 723, the capacity 724, the status 725 and the like are recorded. The LUN 721 is information for uniquely specifying the LU 39. The LDEV number 722 is a number of the LDEV assigned to the LU 39 (hereinafter, referred to as "corresponding LU 39") specified by the corresponding LUN 721. The RG number 723 is a number of the RAID group 38 which the LDEV assigned to the corresponding LU 39 belongs to. The capacity 724 is a size of the corresponding LU 39. The status 725 is information indicative of a status of the corresponding LU 39 such as whether or not the corresponding LU 39 is completed in a format. In the example of FIG. 8, the status 725 becomes "complete" when the corresponding LU 39 is completed in a format and it becomes "not" when the corresponding LU 39 is not completed in format.

FIG. 9 is a diagram to illustrate an example of the copy pair management table 73.

The copy pair management table 37 is a table for managing the replication information 54. In the copy pair management table 37, for each copy pair, for example, the pair ID 731, the copy type 732, the PVOL (Primary Volume) 733, the SVOL (Secondary Volume) 734, the status 735 and the like are memorized. The copy ID 731 is information for uniquely specifying a copy pair. The copy type 732 is information indicative of a copy type (for example, a synchronous copy or an asynchronous copy or the like) employed by a copy pair (hereinafter, "corresponding copy pair") specified by the corresponding copy ID 731. The PVOL 733 is information regarding a PVOL of the corresponding copy pair. The PVOL 733 is configured of, for example, a serial number, an LUN and a host name. The serial number is a serial number of the storage system 3 having a PVOL in the corresponding copy pair. The LUN is an LUN of a PVOL in the corresponding copy pair. The host name is a name of the host 1 using a PVOL in the corresponding copy pair. The SVOL 734 is information regarding an SVOL in the corresponding copy pair. The SVOL 734 is configured of, for example, a serial number, an LUN and a host name, like the PVOL 733. The serial number of the SVOL 734 is a serial number of the storage system 3 having a SVOL in the corresponding copy pair. The LUN of the SVOL 734 is an LUN of a SVOL in the corresponding copy pair. The host name of the SVOL 734 is a name of the host 1 using a SVOL in the corresponding copy pair. The status 735 is information indicative of corresponding copy pair status (for example, "copying" or "copy complete" or the like).

Figure 10:
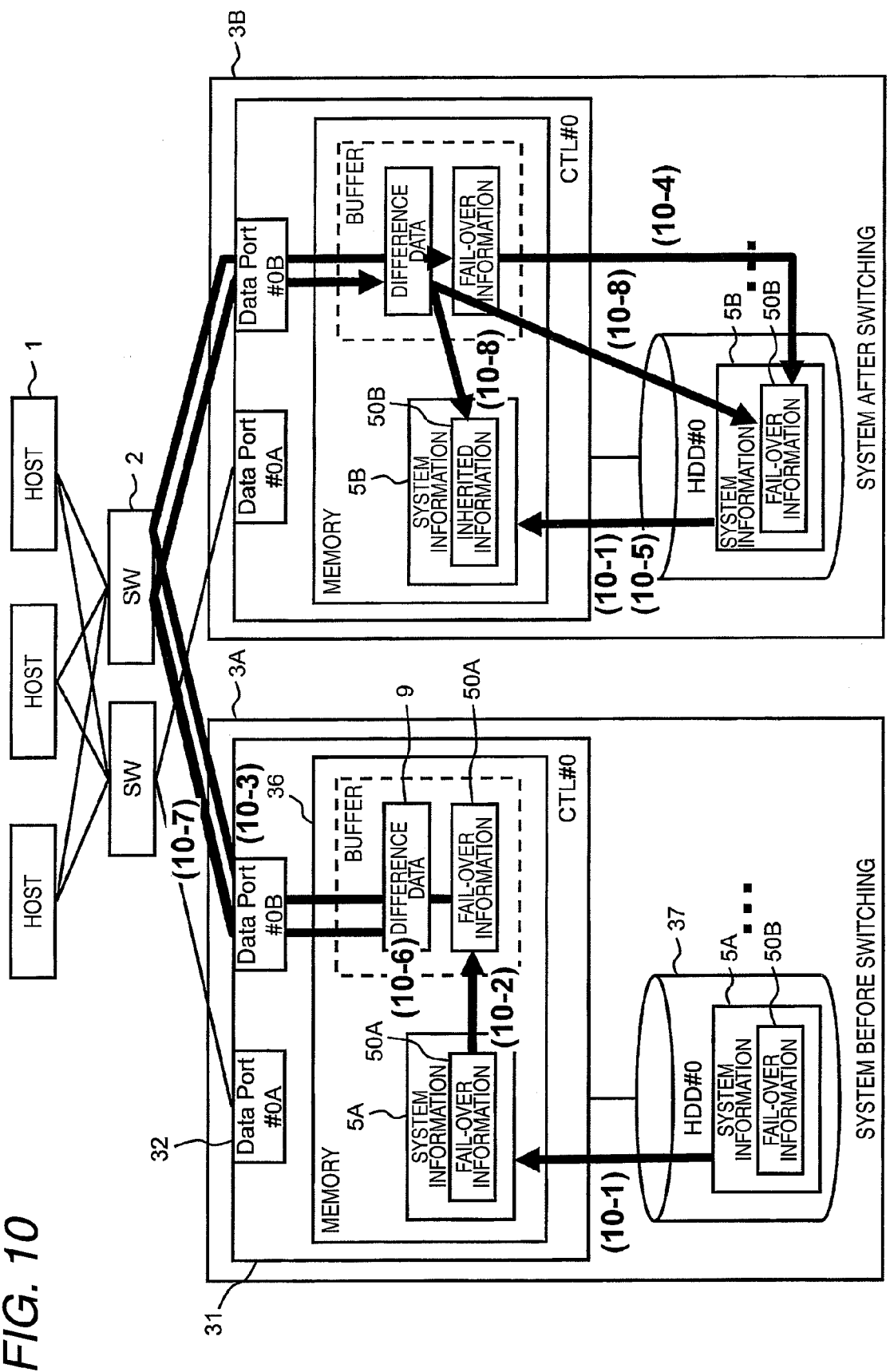
FIG. 10 is a diagram to illustrate a migration method of the fail-over information.

FIG. 10 is a diagram to illustrate a migration method of the fail-over information 50.

The migration of the fail-over information 50 is performed, for example, according to the following flows of (10-1) to (10-5). In addition, the flows of (10-6) to (10-8) are processings for keeping a matching of the fail-over information 50 in both the systems 3A and 3B. Hereinafter, the system information 5 of the system 3A before switching is represented as "system information 5A" and the system information 5 of the system 3B after switching is represented as "system information 5B." The fail-over information 50 of the system 3A before switching is represented as "fail-over information 50A" and the fail-over information 50 of the system 3B after switching is represented as "fail-over information 50B."

(10-1) The system information 5A and 5B are read out from the HDDs 37 to be stored in the memory 36 at the time of start-up, in each of the system 3A before switching and the system 3B after switching.

(10-2) When the switching processing is executed and then migration of the fail-over information 50 is initiated, the system 3A before switching first copies the fail-over information 50A of the system information 5A to a buffer region of the memory 36.

(10-3) The fail-over information 50A in the buffer region of the system 3A before switching is transferred to the system 3B after switching to be stored in a buffer region of the system 3B after switching. The transfer of the fail-over information 50 between both the systems 3A and 3B is performed over one migration path (in the example of FIG. 10, the migration path #0B).

(10-4) The system 3B after switching overwrites the fail-over information 50 stored in the buffer region on the fail-over information 50B memorized in the HDDs 37. Thereby, the fail-over information 50B of the system 3B after switching is changed into the same thing as the fail-over information 50A of the system 3A before switching.

(10-5) When the system 3B after switching starts again, the system information 5B in which the fail-over information 50B is changed into the same thing as the system 3A before switching is read out from the HDDs 37 to be stored in the memory 36.

In addition, the fail-over information 50A is often changed in a content thereof by I/O from the host 1, even after the migration is completed. Thus, the following processings (10-6) to (10-8) are performed.

(10-6) The system 3A before switching memorizes difference data 9 indicative of a difference between the fail-over information 50A upon migration and fail-over information changed thereafter (hereinafter, referred to as "fail-over information after migration") 50A' in the buffer region.

(10-7) The system 3A before switching transfers the difference data 9 to the system 3B after switching after completion of the user data 6.

(10-8) The system 3B after switching updates the fail-over information 50B memorized in the HDDs 37 and/or the fail-over information 50B memorized in the memory 36 in a content of the fail-over information 50A' after migration, based on the transferred difference data 9. Thereby, although the fail-over information 50A is changed by I/O from the host 1 after migration, the fail-over information 50A and 50B in the system information 5 of both the systems 3A and 3B are kept as the same content.

Figure 11:
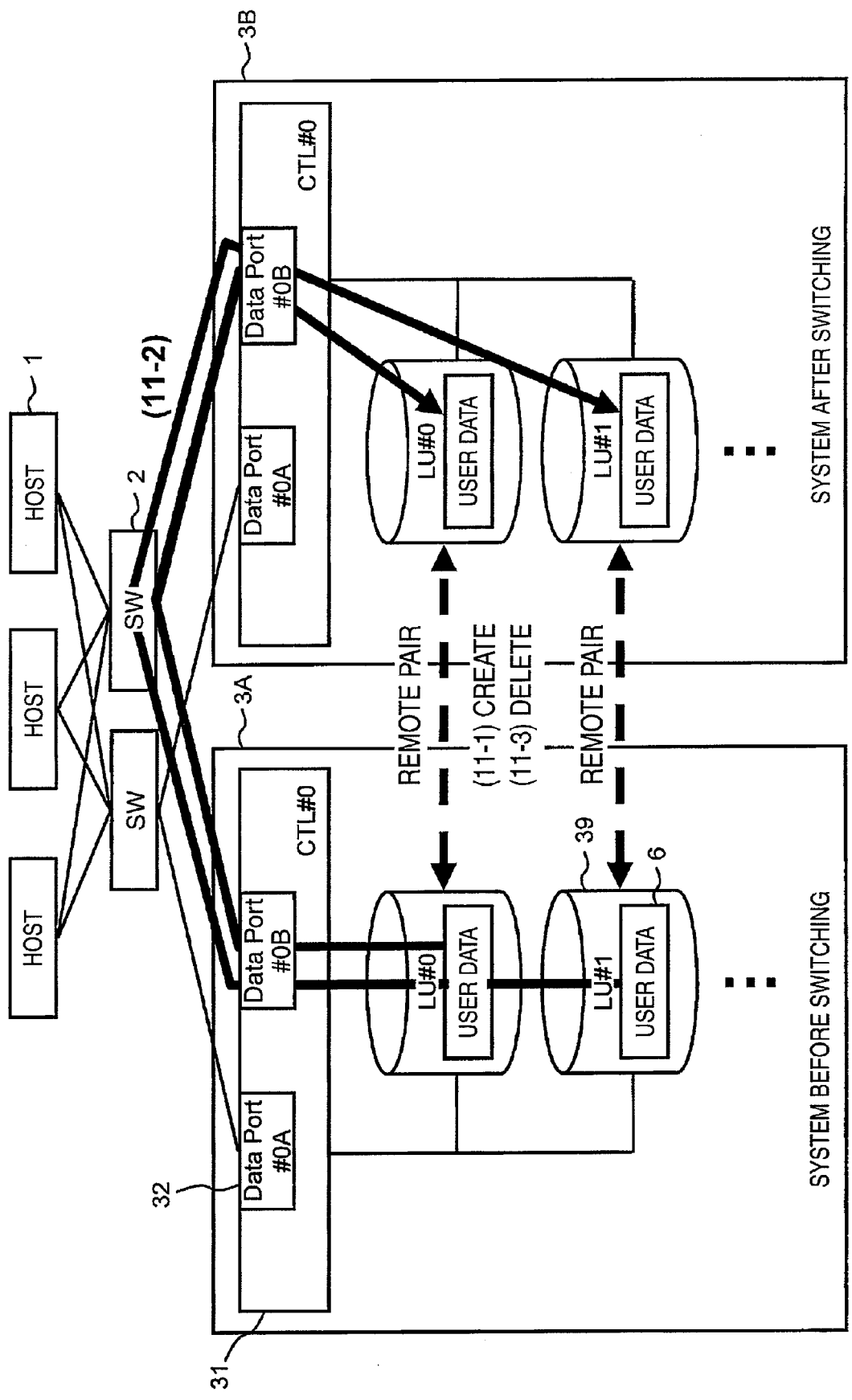
FIG. 11 is a diagram to illustrate a migration method of the user data.

FIG. 11 is a diagram to illustrate a migration method of the user data 6.

The migration of the user data 6 is performed, for example, according to the following flows of (11-1) to (11-3).

(11-1) A remote pair is created between the corresponding LUs 39 in the system 3A before switching and the system 3B after switching. In this case, the LUs 39 of both the systems 3A and 3B have the same configuration (that is, the LUs 39 having the same LUN or capacity are configured in both the systems 3A and 3B) at the time point when the user data 6 is transferred. In the creation of the remote pair, the LUs 39 having the same LUN become the corresponding LUs 39. In addition, of the LUs 39 configuring the remote pair, the LU 39 of the system 3A before switching becomes the PVOL and the LU 39 of the system 3B after switching becomes the SVOL. The creation of the remote pair is performed by, for example, registering information regarding the remote pair to be created with the copy pair management table 73. In the example of FIG. 11, the remote pairs become between the LUs #0 and between the LUs #1, respectively.

(11-2) The user data 6 within the PVOL (that is, the LU 39 of the system 3A before switching) configuring the remote pair is copied to the corresponding SVOL (that is, the LU 39 of the system 3B after switching) by a function of the remote pair. The copy of the user data 6 may be performed under bidirectional control of the duplicated CTLs 31 and may be performed under one directional control thereof. One migration path is used for each of the CTLs 31. A case of the copy of the user data 6 being performed under control of two CTLs 31 can complete the copy of the user data 6 at a higher speed compared with a case of being performed under control of one CTL 31. The reason is that the user data 6 is transferred over two migration paths (one migration path for one CTL 31) in the case of being performed under control of two CTLs 31. In other words, the reason is that the transfer of the user data 6 is performed divided. In the example of FIG. 11, the copy of the user data 6 is performed using the migration path #0B under control of the CTL #0. For example, when the copy of the user data 6 is performed under control of the CTL #0 and the CTL #1, the migration path #1B is also used in addition to the migration path #0B.

(11-3) After completion of the transfer of the user data 6, the remote pair created in the step (11-1) is deleted. In other words, the information regarding the remote pair created in the step (11-1) is deleted from the copy pair management table 73. The deletion of the remote pair is performed after a switching-execution instruction is received from a user. The PVOL and the SVOL keep a synchronous state until the remote pair is deleted.

Hereinafter, the switching processing related to this embodiment will be described in detail with reference to the flowcharts. Although the main body for performing the processing is described as the CTL 31 for the storage system 3, actually, the processing is performed by the CPU 34 included in the CTL 31 executing a computer program.

Figure 12:
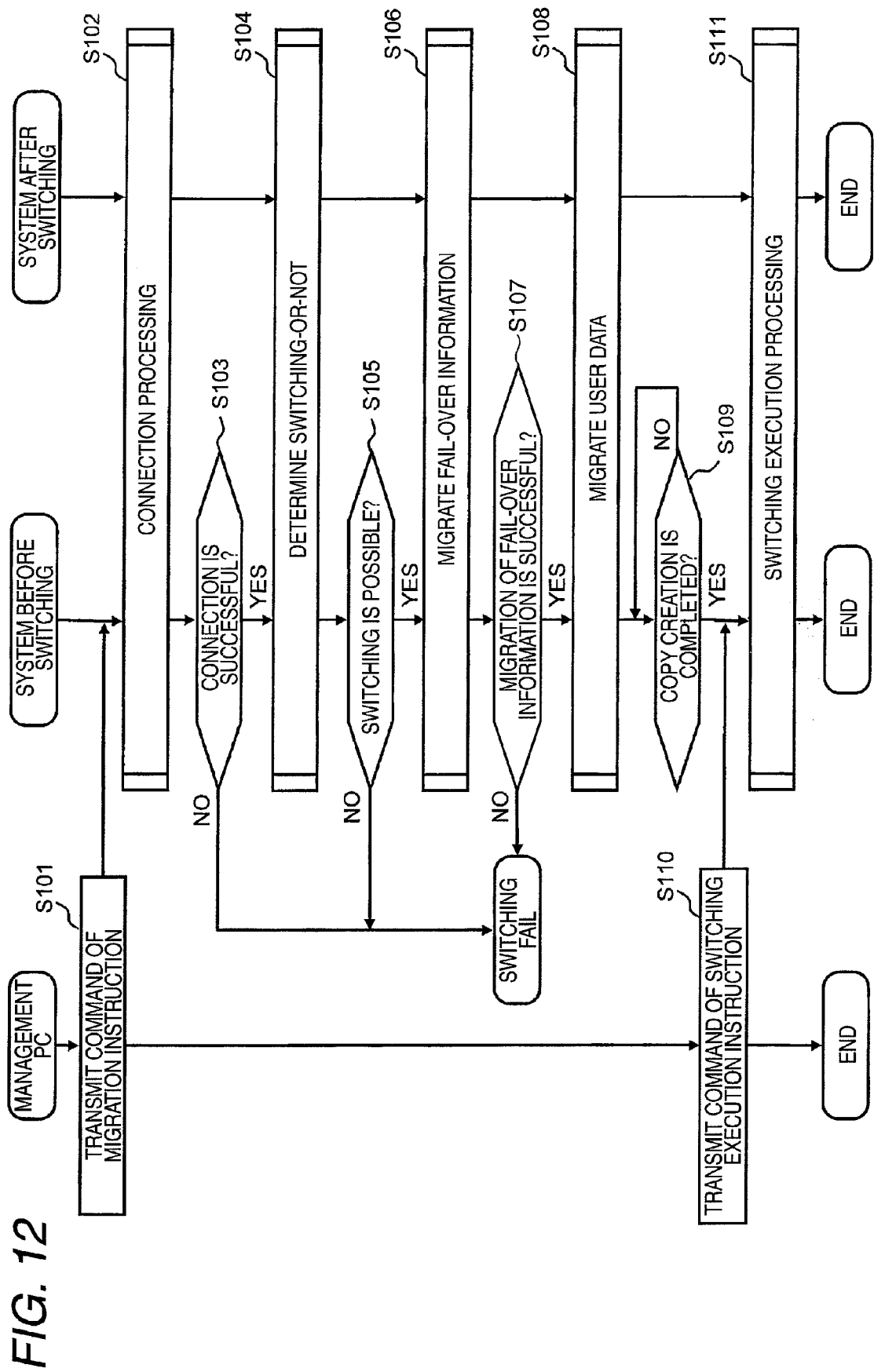
FIG. 12 is a flowchart to illustrate the switching processing.

FIG. 12 is a flowchart to illustrate the switching processing.

First, the control application 41 of the management PC 4 to receive an instruction for a switching processing from a user transmits a command of migration instruction to the CTL 31 of the system 3A before switching (S101). When the command of migration instruction is transferred, predetermined parameters (in this embodiment, the device ID and the IP address of the system 3B after switching (the device ID and the IP address assigned to the system 3B after switching at the time point when such switching processing is initiated)) designated by the user are notified to the system 3A before switching, together with the command of migration instruction.

The CTL 31 of the system 3A before switching to have received the command of migration instruction performs a processing for connecting to the CTL 31 of the system 3B after switching (hereinafter, referred to as "connection processing") (S102).

Thereafter, the CTL 31 of the system 3A before switching determines whether or not connection between the CTLs 31 of both the systems 3A and 3B is successful (S103).

When connection between the CTLs 31 of both the systems 3A and 3B fails (S103: NO), the CTL 31 of the system 3A before switching finishes the switching processing.

On the other hand, when connection between the CTLs 31 of both the systems 3A and 3B is successful (S103: YES), the CTLs 31 of both the systems 3A and 3B check whether or not a switching of both the systems 3A and 3B is possible (hereinafter, referred to as "switching-or-not determination processing") (S104).

Then, the CTL 31 of the system 3A before switching determines a result of the switching-or-not determination processing (that is, whether or not the switching of both the systems 3A and 3B is possible) (S105).

When the switching of both the systems 3A and 3B is determined to be impossible (S105: NO), the CTL 31 of the system 3A before switching finishes the switching processing.

In contrast, when the switching of both the systems 3A and 3B is possible (S105: YES), the fail-over information 50 is migrated to the system 3B after switching from the system 3A before switching (hereinafter, referred to as "fail-over information migration processing") (S106).

Subsequently, the CTL 31 of the system 3A before switching determines whether or not migration of the fail-over information 50 is successful (S107).

When the migration of the fail-over information 50 fails (S107: NO), the CTL 31 of the system 3A before switching finishes the switching processing.

Otherwise, when the migration of the fail-over information 50 is successful (S107: YES), the user data 6 is migrated to the system 3B after switching from the system 3A before switching (hereinafter, referred to as "user data migration processing") (S108).

After completion of the migration of the user data 6 (S109: YES), the control application 41 of the management PC 4 transmits a command of the switching-execution instruction to the CTL 31 of the system 3A before switching, according to an instruction from the user (S110). When the command of the switching-execution instruction is transmitted, predetermined parameters (in this embodiment, an IP address (hereinafter, "temporary IP address") temporarily assigned to the data port 32 of the system 3A before switching at the time of the migration of the IP address) designated by the user is notified to the system 3A before switching, together with the command of switching-execution instruction. In this case, the temporary IP address is an unused address. For example, the system 3A before switching designates a temporary IP address, issues a command (for example, PING command) to request for a response from a device having the address and confirms that a response to the command does not return, and thereby it can confirm that the temporary IP address is unused. For example, the system 3A before switching can determine that there is no response when it does not receive a response to a command, waiting for a predetermined time after transmitting the command.

The CTL 31 of the system 3A before switching to have received the command of the switching-execution instruction performs a switching-execution processing (S111). The switching-execution processing is a processing that the device ID or the IP address of the system 3B after switching is changed into that of the system 3A before switching and thereby the host 1 can recognize the system 3B after switching.

Figure 13:
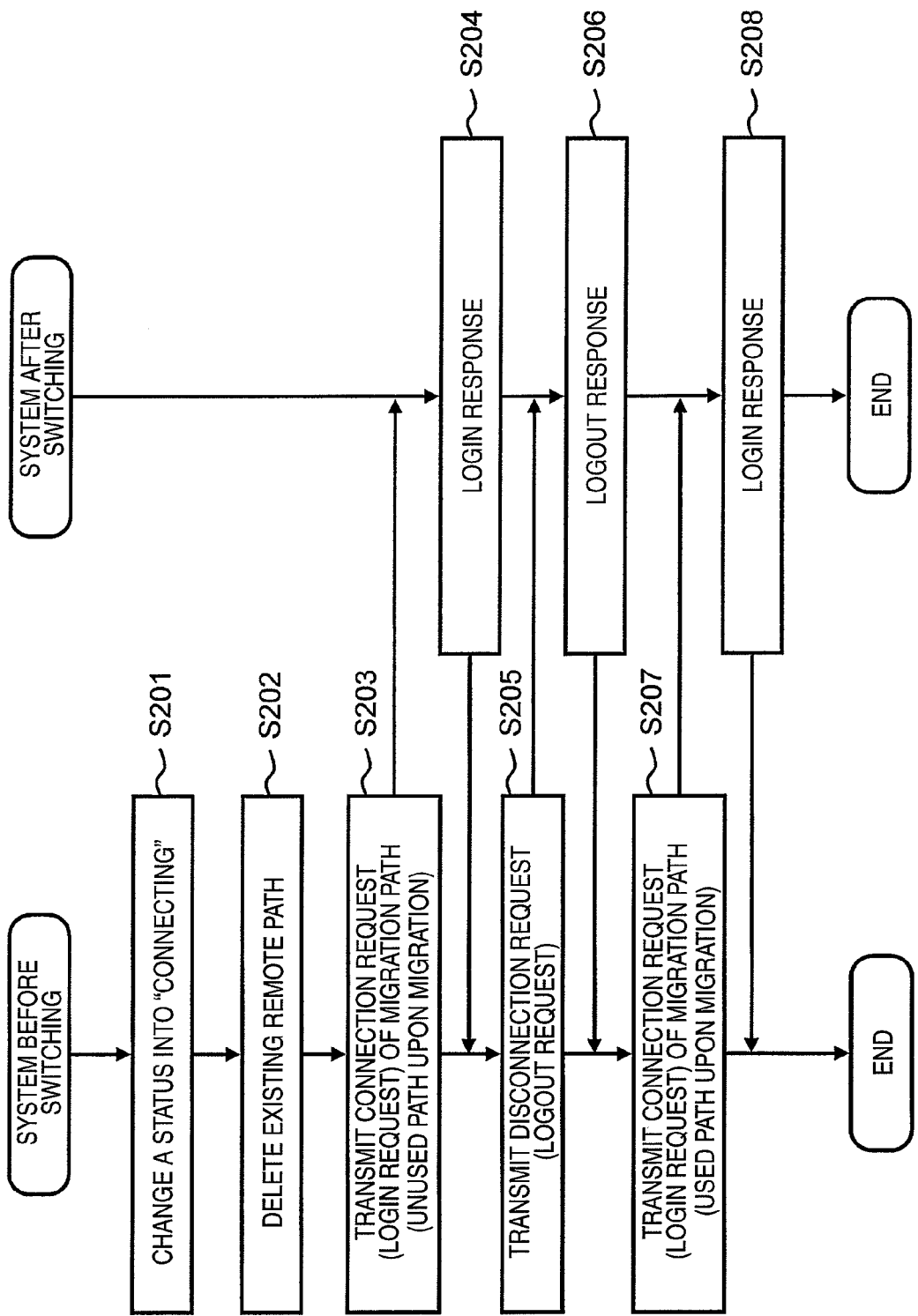
FIG. 13 is a flowchart to illustrate a connection processing.

FIG. 13 is a flowchart to illustrate a connection processing.

First, the CTL 31 of the system 3A before switching changes the switching processing status into "connecting" (S201). In detail, the CTL 31 of the system 3A before switching changes a value of the switching status information 82 memorized in the memory 36 into a value indicative of "connecting."

Successively, the CTL 31 of the system 3A before switching deletes an existing remote path to have created in the system 3A before switching (S202).

Thereafter, the CTL 31 of the system 3A before switching checks whether or not, about a migration path (hereinafter, "unused path upon migration") unused for migration of the user data 6 and the fail-over information 50, a connection is possible over the path. The connection check herein is performed by whether or not a login is possible over the unused path upon migration.

In other words, the CTL 31 of the system 3A before switching first transmits a connection request (login request) over the unused path upon migration to the CTL 31 of the system 3B after switching (S203). The CTL 31 of the system 3B after switching to have received the login request returns a login response to the CTL 31 of the system 3A before switching (S204). By receiving the login response (by successful login), the connection over the path is confirmed to be possible about the unused path upon migration which is used for the login.

Then, the CTL 31 of the system 3A before switching transmits a disconnection request (logout request) over the unused path upon migration to the CTL 31 of the system 3B after switching (S205). The CTL 31 of the system 3B after switching to have received the logout request returns a logout response to the CTL 31 of the system 3A before switching (S206). As above, the unused path upon migration is disconnected. The reason is that the unused path upon migration is not used for migration of the user data 6 and the fail-over information 50.

For example, when two CTLs 31 (CTL #0 and CTL #1) are available, the unused path upon migration becomes the migration path #0A and the migration path #1A. In this case, the connection check (the processings of the steps S203 and S204) and the disconnection (the processings of the steps S205 and S206) are performed for each of the migration path #0A and the migration path #1A.

Thereafter, the CTL 31 of the system 3A before switching checks whether or not, about a migration path (hereinafter, "used path upon migration") used for migration of the user data 6 and the fail-over information 50, a connection is possible over the path. The connection check herein is performed by whether or not a login is possible over the used path upon migration, like the connection check for the unused path upon migration.

In other words, the CTL 31 of the system 3A before switching first transmits a connection request (login request) over the used path upon migration to the CTL 31 of the system 3B after switching (S207). The CTL 31 of the system 3B after switching to have received the login request returns a login response to the CTL 31 of the system 3B before switching (S208). By receiving the login response (by successful login), the connection over the path is confirmed to be possible about the used path upon migration which is used for the login.

For example, when two CTLs 31 (CTL #0 and CTL #1) are available, the used path upon migration becomes the migration path #0B and the migration path #1B. In this case, the connection check (the processings of the steps S207 and S208) is performed for each of the migration path #0B and the migration path #1B. The used path upon migration is not disconnected since it is used for the migration of the user data 6 and the fail-over information 50.

After the connection processing, data communication between both the systems 3A and 3B is performed over the used path upon migration whose connection is confirmed at the processings of the steps S207 and S208.

Figure 14:
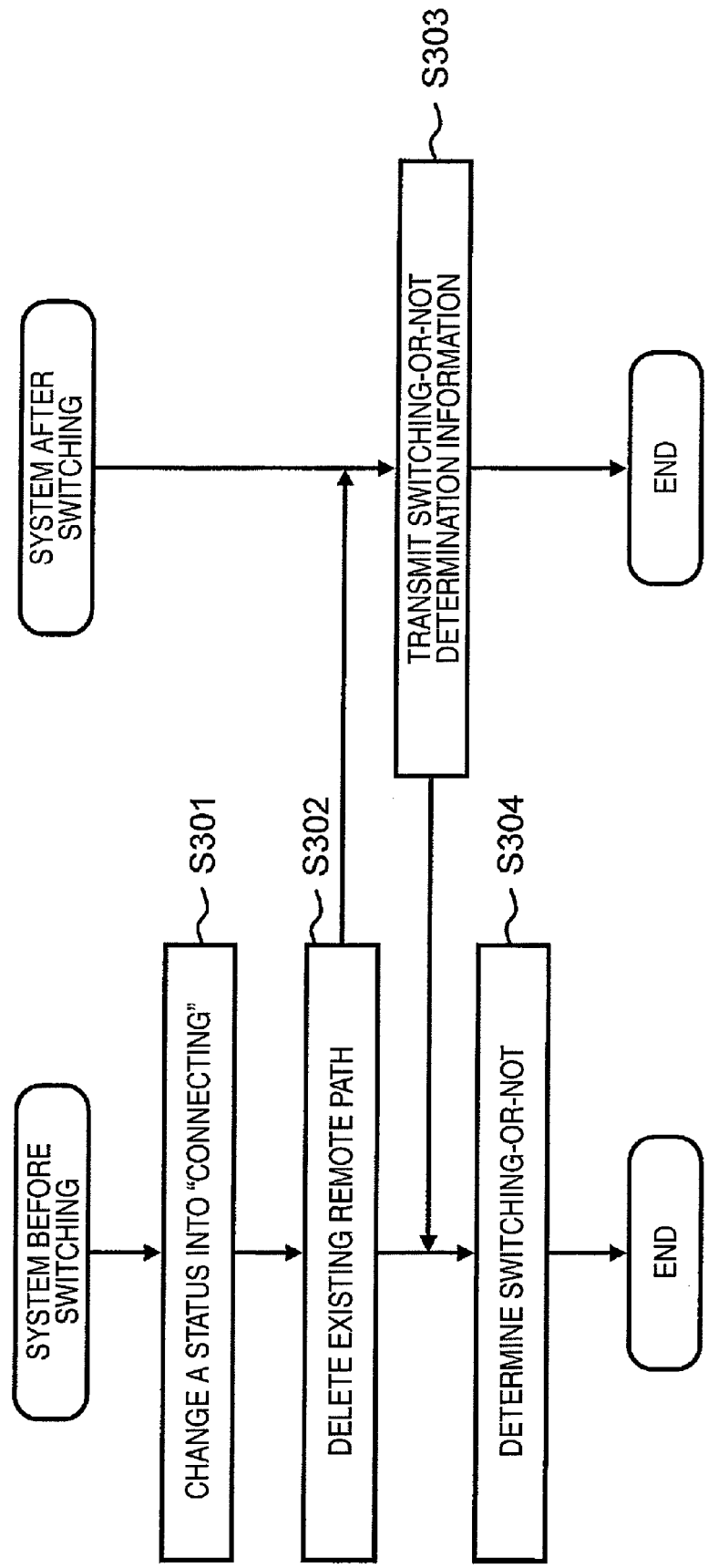
FIG. 14 is a flowchart to illustrate the switching-or-not determination processing.

FIG. 14 is a flowchart to illustrate the switching-or-not determination processing.

The CTL 31 of the system 3A before switching first changes the switching processing status into "switching-or-not determining" (S301). In detail, the CTL 31 of the system 3A before switching changes a value of the switching status information 82 memorized in the memory 36 into a value indicative of "switching-or-not determining."

Subsequently, the CTL 31 of the system 3A before switching transmits a request for transmission of information (hereinafter "switching-or-not determination information") for determining a switching-or-not to the CTL 31 of the system 3B after switching (S302). Herein, the determination of the switching-or-not is performed based on information specialized to each of two systems 3A and 3B to be unchangeable (for example, the number or the capacity of the HDDs 37). In detail, for example, when the number and the capacity of the HDDs 37 of the system 3B after switching are smaller than those of the HDDs 37 of the system 3A before switching, a switching is determined to be impossible. This is because LUs 39 having the same capacity as the system 3A before switching cannot be configured and the user data cannot be migrated, in the system 3B after switching. In contrast, other than the above-described case (that is, when the number and the capacity of the HDDs 37 of the both the systems 3A and 3B are the same or when the system 3B after switching is larger), a switching is determined to be possible. Thus, when the determination method based on the number and the capacity of the HDDs 37 described above is employed, the switching-or-not determination information becomes information indicative of the number of the capacity of the HDDs 37 and the system 3B after switching.

The CTL 31 of the system 3B after switching to have received the request for transmission of switching-or-not determination information transmits the switching-or-not determination information (for example, the information indicative of the number and the capacity of the HDDs 37 of the system 3B after switching) to the CTL 31 of the system 3A before switching (S303).

Thereafter, the CTL 31 of the system 3A before switching determines whether or not a switching is performed (S304). In detail, if determined based on the number and the capacity of the HDDs 37, information indicative of the number and the capacity of the HDDs 37 of the system 3A before switching is obtained from the system information 5 in the memory 36. The numbers and the capacities of the HDDs 37 of both the systems 3A and 3B are compared, respectively, based on the information from the memory 36 and the received switching-or-not determination information.

Although the system 3A before switching determines whether or not a switching is performed in this embodiment, the system 3B after switching may determine whether or not a switching is performed. When the system 3B after switching determines it, for example, the processing is as follows. That is, the CTL 31 of the system 3A before switching transmits switching-or-not determination information (information indicative of the number and the capacity of the HDDs 37 of the system 3A before switching) to the CTL 31 of the system 3B after switching. Then, the CTL 31 of the system 3B after switching determines whether or not a switching is performed. In detail, when determining based on the number and the capacity of the HDDs 37, the CTL 31 of the system 3B after switching obtains information indicative of the number and the capacity of the HDDs 37 of the system 3B after switching from the system information 5 in the memory 36. The CTL 31 of the system 3B after switching compares the numbers and the capacities of HDDs 37 of both the systems 3A and 3B, respectively, based on the information obtained from the memory 36 and the switching-or-not determination information received from the system 3A before switching. Thereafter, the CTL 31 of the system 3B after switching transmits a result of the switching-or-not determination to the CTL 31 of the system 3A before switching.

Figure 15:
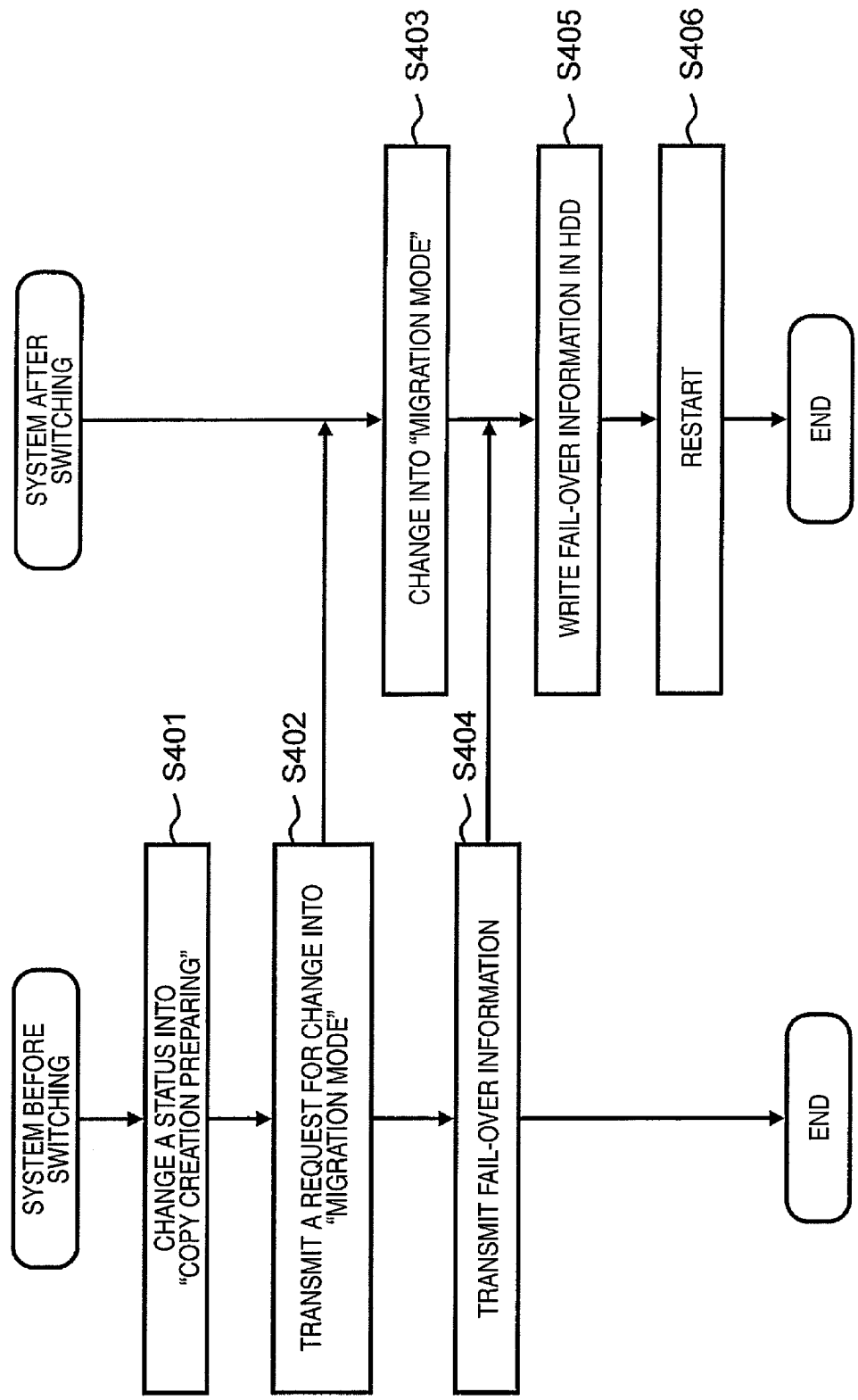
FIG. 15 is a flowchart to illustrate the fail-over information migration processing.

FIG. 15 is a flowchart to illustrate the fail-over information migration processing.

The CTL 31 of the system 3A before switching first changes the switching processing status into "copy creation preparing" (S401). In detail, the CTL 31 of the system 3A before switching changes a value of the switching status information 82 memorized in the memory 36 into a value indicative of "copy creation preparing."

Then, the CTL 31 of the system 3A before switching transmits a request for change of an operation mode of the system 3B after switching into "migration mode" to the system 3B after switching (S402). In addition, the system 3B after switching prohibits change into the "migration mode" in order to prevent the user data 6 from being mis-deleted when the user data 6 is written even once. In detail, for example, the CTL 31 of the system 3B after switching writes a migration prohibited status in the memory 36 of the CTL 31. The user transmits a request for unlock of the migration prohibition to the system 3B after switching via the management PC 4 whereby unlock of such prohibition is performed.

The CTL 31 of the system 3B after switching to have received the request for change of an operation mode changes the operation mode into "migration mode" (S403). In detail, the CTL 31 of the system 3B after switching changes a value of the mode information 81 memorized in the memory 36 into a value indicative of "migration mode."

Subsequently, the CTL 31 of the system 3A before switching transmits the fail-over information 50A to the system 3B after switching over the used path upon migration (S404). As described above, the transmitted fail-over information 50A is stored in the buffer region of the system 3B after switching.

Then, the CTL 31 of the system 3B after switching overwrites the fail-over information 50B stored in the buffer region on the fail-over information 50B memorized in the HDDs 37 (S405).

Subsequently, the system 3B after switching restarts (S406). Thereby, the system information 5B of which the fail-over information 50B is changed into the same thing as the system 3A before switching is read out from the HDDs 37 to be stored in the memory 36.

Figure 16:
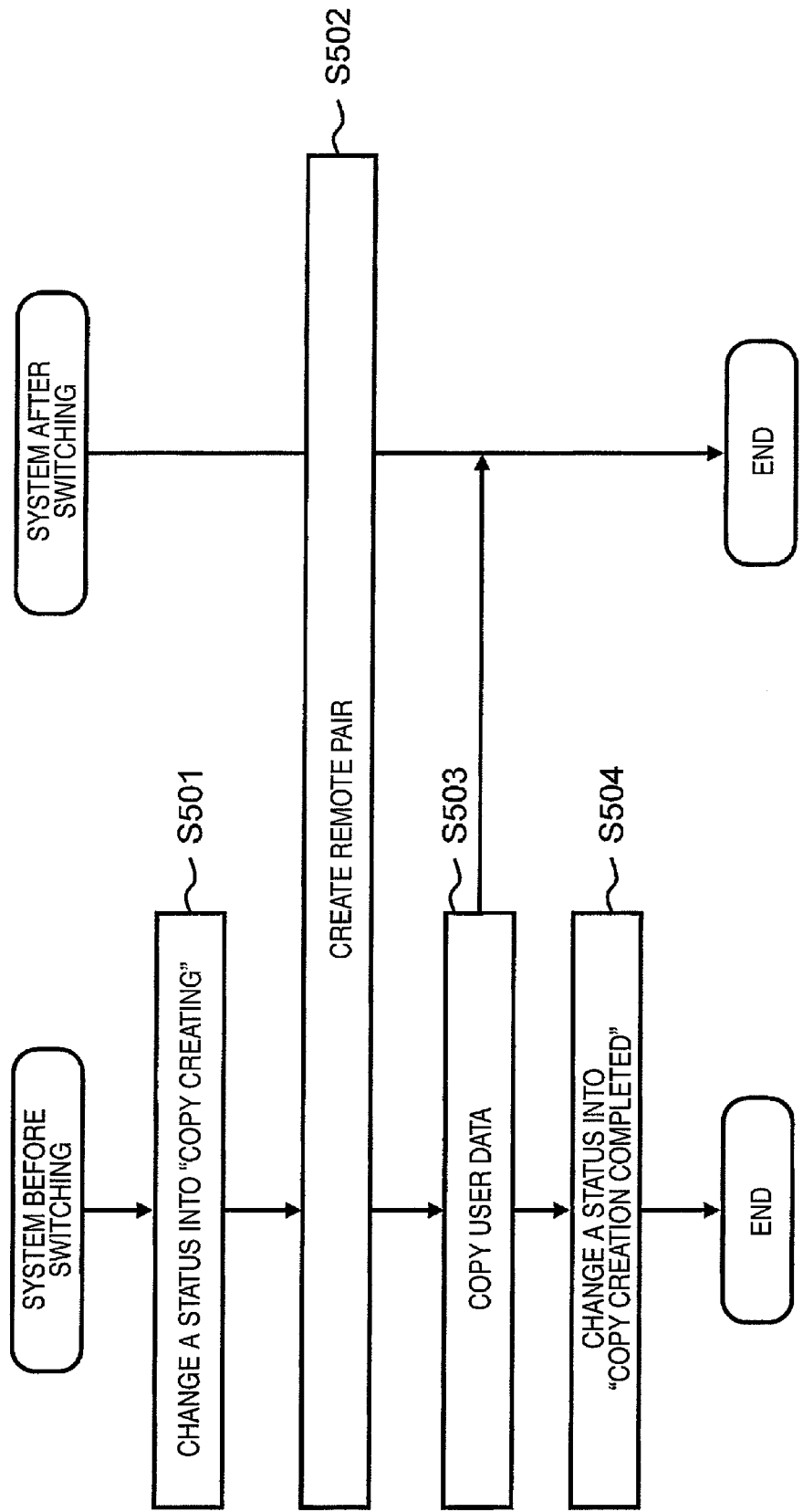
FIG. 16 is a flowchart to illustrate the user data migration processing.

FIG. 16 is a flowchart to illustrate the user data migration processing.

The CTL 31 of the system 3A before switching changes the switching processing status into "copy creating" (S501). In detail, the CTL 31 of the system 3A before switching changes a value of the switching status information 82 memorized in the memory 36 into a value indicative of "copy creating."

Subsequently, the CTL 31 of the system 3A before switching creates a remote pair between corresponding LUs 39 in both the systems 3A and 3B, in combination with the CTL 31 of the system 3B after switching (S502). In detail, information regarding the remote pair to be created is registered with the copy pair management table 73.

Then, user data 6 within a PVOL (that is, an LU 39 of the system 3A before switching) configuring the remote pair is copied to a corresponding SVOL (that is, an LU 39 of the system 3B after switching) by the function of the remote pair (S503).

After the copy of the user data 6 is completed, the CTL 31 of the system 3A before switching changes the switching processing status into "copy creation completed" (S504). In detail, the CTL 31 of the system 3A before switching changes a value of the switching status information 82 memorized in the memory 36 into a value indicative of "copy creation completed."

In addition, the PVOL and the SVOL keep a synchronous state even after the copy of the user data 6 is completed. For this reason, user data 6 written in the PVOL after completion of the copy is also copied to the SVOL.

Figure 17:
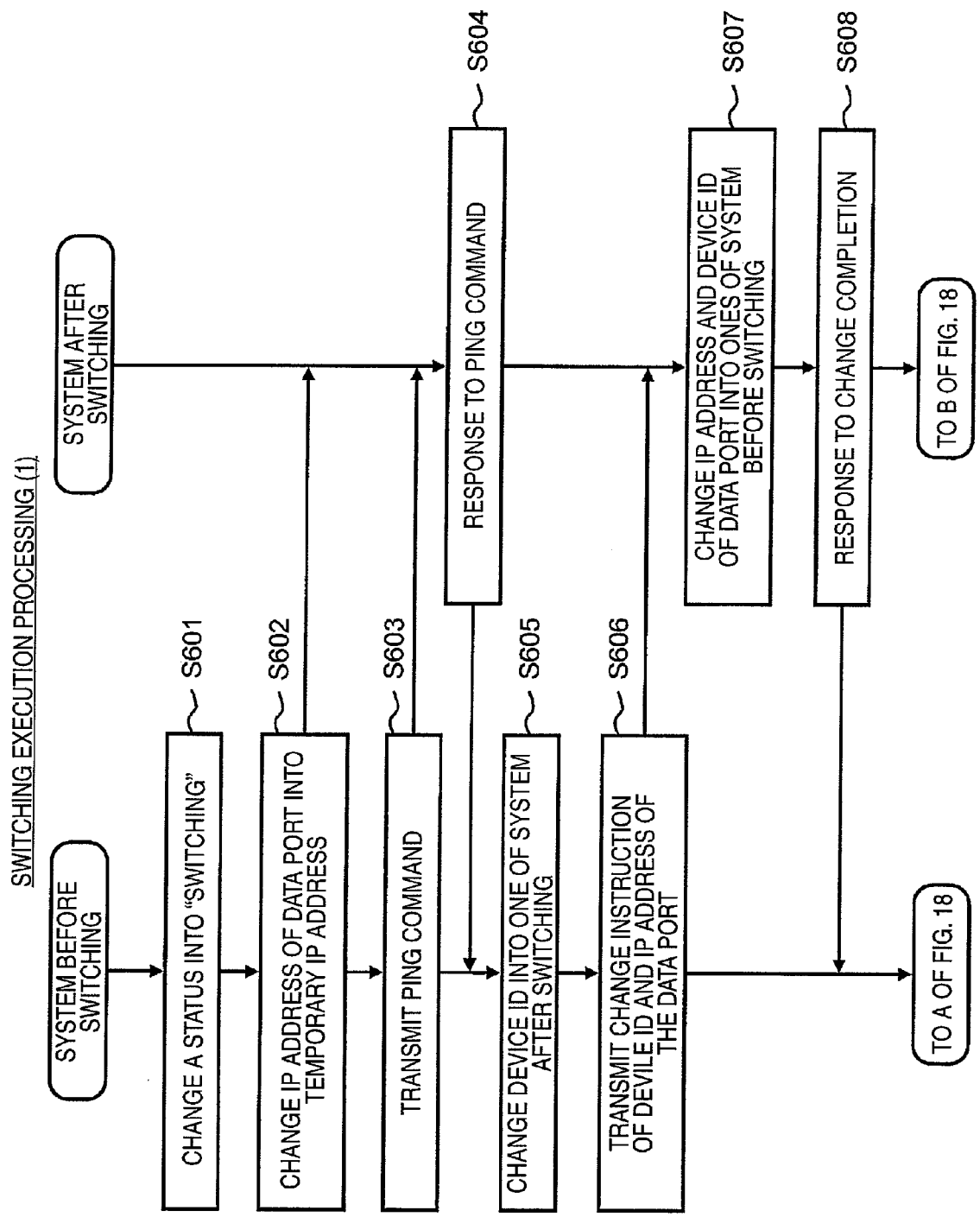
FIG. 17 is a flowchart to illustrate the switching-execution processing (first half)
Figure 18:
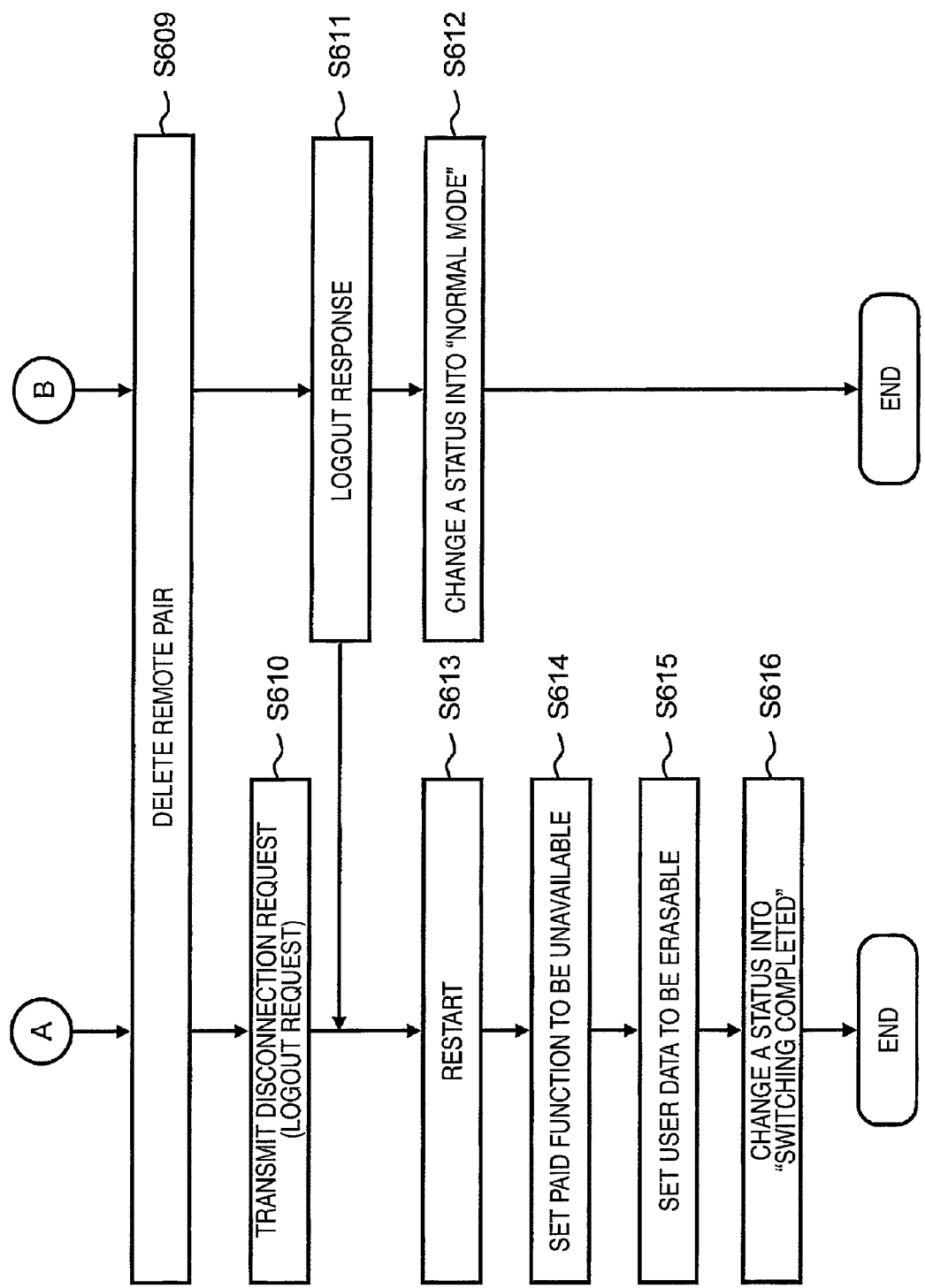
FIG. 18 is a flowchart to illustrate the switching-execution processing (second half)

FIGS. 17 and 18 are flowcharts to illustrate the switching-execution processing.

As shown in FIG. 17, the CTL 31 of the system 3A before switching changes the switching processing status into "switching" (S601). In detail, the CTL 31 of the system 3A before switching changes a value of the switching status information 82 memorized in the memory 36 into a value indicative of "switching." The system 3A before switching of which the switching processing status is changed into "switching" does not return a response to I/O from the host 1. However, a connection between the system 3A before switching and the host 1 is kept.

The CTL 31 of the system 3A before switching changes the IP address of the data port 32 of the system 3A before switching into a temporary IP address designated by the user (S602). In this case, the changed IP address is an IP address of each of all the data ports 32 included in the system 3A before switching.

Thereafter, the CTL 31 of the system 3A before switching checks whether or not, about the unused path upon migration, a connection is possible over the path. The connection check herein is performed by confirming whether or not a predetermined command is transmitted and then a response to the command returns, unlike that in the connection processing. In this case, the predetermined command is a command which designates an address (for example, an IP address) for specifying a communication partner and requests a response from a device having the address, for example, is a PING command. In this embodiment, the PING command is used as the predetermined command.

That is, the CTL 31 of the system 3A before switching designates an IP address of the data port 32 to which the unused path upon migration in the system 3B after switching is connected to transmit the PING command (S603). The CTL 31 of the system 3B after switching to have received the PING command returns a response to the PING command to the CTL 31 of the system 3A before switching (S604). By receiving the response to the PING command, the connection over the path is confirmed to be possible about the unused path upon migration.

In this case, the connection check about the used path upon migration is not performed. The reason is that the used path upon migration is connected at the processings of the steps S207 and S208 in FIG. 13 and such status is still kept at this time point.

Thereafter, the CTL 31 of the system 3A before switching changes a device ID of the system 3A before switching into a device ID of the system 3B after switching (S605). That is, at this time point, the device IDs of both the systems 3A and 3B altogether become the device ID (an ID assigned to the system 3B after switching until the switching processing is performed) of the system 3B after switching.

Then, the CTL 31 of the system 3A before switching transmits the device ID and the IP address (the ID and the IP address assigned to the system 3A before switching until the switching processing is performed) of the system 3A before switching to the CTL 31 of the system 3B after switching (S606). In this case, the transmitted IP address is an IP address of each of all the data ports 32 included in the system 3A before switching.

The CTL 31 of the system 3B after switching to have received the device ID and the IP address changes a device ID of the system 3B after switching and an IP address of the data port 32 of the system 3B after switching into the received device ID and the IP address (S607). In this case, the changed IP address is an IP address of each of all the data ports 32 included in the system 3B after switching. Due to the change at the step S607, the devices IDs of both the systems 3A and 3B are replaced. In addition, after changing the IP address, the CTL 31 of the system 3B after switching may transmit an instruction to reset a conversion table (for example, an ARP (Address Resolution Protocol) table) used for an MAC address and an IP address to the system 3A before switching. The CTL 31 of the system 3A before switching to have received the instruction to reset the conversion table resets a conversion table which is maintained by the system 3A before switching. For example, the CTL 31 of the system 3A before switching erases information registered with the conversion table or erases the conversion table itself.

The CTL 31 of the system 3B after switching returns a response to complete the change to the CTL 31 of the system 3A before switching (S608).

As shown in FIG. 18, the CTL 31 of the system 3A before switching deletes the remote pair created at the step S502 in FIG. 16 in combination with the CTL 31 of the system 3B after switching (S609). In detail, information regarding the remote pair which is a deletion target is deleted from the copy pair management table 73.

The CTL 31 of the system 3A before switching transmits a request (logout request) for disconnection over the used path upon migration to the CTL 31 of the system 3B after switching (S610).

The CTL 31 of the system 3B after switching to have received the logout request returns a logout response to the CTL 31 of the system 3A before switching (S611).

The CTL 31 of the system 3B after switching to have returned the logout response changes the operation mode into "normal mode" (S612). In detail, the CTL 31 of the system 3B after switching changes a value of the mode information 81 memorized in the memory 36 into a value indicative of "normal mode." The CTL 31 of the system 3B after switching can receive I/O from the host 1 by change into the normal mode. In addition, the paid function (which is migrated from the system 3A before switching) loaded in the CTL 31 of the system 3B after switching is also available. A response to I/O from the host 1 is not performed from after the switching processing status in the system 3A before switching is changed into "switching" until the operation mode of the system 3B after switching becomes "normal mode." Only, this time is very short (for example, 30 seconds or less) and is enough shorter than a time when a connection of the host 1 to the storage system 3 becomes a time-out error. For this reason, an affect is not made on applications run on the host 1.

Then, the CTL 31 of the system 3A before switching restarts the system 3A before switching (S613).

The CTL 31 of the system 3A before switching makes the paid function loaded in the system 3A before switching unavailable (S614). In detail, for all the paid functions loaded in the system 3A before switching, a using-or-not information of the paid function information 56 is changed into a value indicative of unavailability (for example, "0"). This prevents the paid function from being effective in excess of a licensed number. In addition, typically, in order that the user intends to make the paid function effective, it is necessary to input key data for unlock. The key data for unlock is assigned to each of the storage systems 3 (that is, each of the device IDs) as different values. If the switching processing is performed, the device ID is exchanged between the system 3A before switching and the system 3B after switching. For this reason, a key data for unlock assigned to the system 3A before switching is continuously available to the system 3B after switching after the switching processing is completed but is not available to the system 3A before switching after the switching processing is completed.

The CTL 31 of the system 3A before switching sets the user data 6 of the system 3A before switching in order to be erasable (S615).

Thereafter, CTL 31 of the system 3A before switching changes the switching processing status into "switching completed" (S616). In detail, the CTL 31 of the system 3A before switching changes the switching status information 82 memorized in the memory 36 into a value indicative of "switching completed."

The embodiments of the present invention described above are examples for illustrating the present invention and the scope of the present invention is not intended to be limited to the embodiments. The present invention can embody in a variety of other aspects without departing from a gist thereof.

Although the fail-over information 50 itself is transmitted and thereby the fail-over information 50 is migrated, the fail-over information 50 may be migrated by the following method. In other words, the system 3A before switching transmits all the system information 5A of the system 3A before switching to the system 3B after switching. The transmitted system information 5A is stored in the buffer region of the system 3B after switching. Then, the system 3B after switching overwrites ones (excluding the device ID and the IP address) corresponding to the fail-over information 50 of the system information 5A stored in the buffer region on the system information 5B in the HDDs 37. Thereby, ones (excluding the device ID and the IP address) corresponding to the fail-over information 50 in the system information 5B are changed into the same as the system 3A before switching.

What is claimed is:

1. Storage systems including a first storage system and a second storage system connected to the first storage system, the second storage system comprising: a second storage device including a second user region which is a storage region accessible from a host and user data accessed from the host is memorized in; and a second system region which is a storage region inaccessible from the host, the second system region memorizing second system information which is information regarding a configuration and a control of the second storage system, wherein, the first storage system comprises:
a first storage device including a first user region which is a storage region accessible from the host and user data accessed from the host is memorized in; and
a first system region which is a storage region inaccessible from the host, the first system region memorizing first system information which is information regarding a configuration and a control of the first storage system;
a first interface device connected to a second interface device which the second storage system has; and
a first controller for controlling a switching of storage system of the first storage system to the second storage system,
wherein the first controller comprises:
a connection check unit configured to check whether or not a connection is possible over a migration path which is a path to connect the first interface device to the second interface device;
a switching-or-not determination unit configured to determine whether or not the switching of storage system from the first storage system to the second storage system is possible, if a connection is determined to be possible by the connection check unit;
a fail-over information migration unit configured to migrate fail-over information which is a migration target of the first system information to the second storage system over the migration path, if the switching is determined to be possible by the switching-or-not determination unit;
a user data migration unit configured to migrate the user data memorized in the first user region to the second storage system over the migration path, after the fail-over information is migrated by the fail-over information migration unit; and
a switching execution unit configured to enable the second storage system to receive I/O from the host after the user data is migrated by the user data migration unit,
wherein the connection check unit is configured to transmit a login request to the second storage system over the migration path and check whether or not a connection over the migration path is possible by confirming whether or not a login response to the transmitted login request is received from the second storage system; and
wherein the switching execution unit is configured to: designate an address for specifying a communication partner; transmit a connection check command for requesting a response from a device having the address to the second storage system over the migration path; check whether or not a connection over the migration path is possible by confirming whether or not a response to the transmitted connection check command is received from the second storage system; if a connection is determined to be possible in the connection check by the connection check command, assign a second ID which is an ID to have been assigned to the second storage system before the switching execution unit initiates the processing to the first storage system; assign a third address different from both a first address which is an address to have been assigned to the first interface device before the switching execution unit initiates the processing and a second address which is an address to have been assigned to the second interface device before the switching execution unit initiates the processing to the first interface device; assign a first ID which is an ID to have been assigned to the first storage system before the switching execution unit initiates the processing to the second storage system; and assign the first address to the second interface device.

2. The storage systems according to claim 1, wherein the connection check command is a PING command.

3. The storage systems according to claim 1, wherein the third address is an unused address designated by a user; and
the first controller is configured to designate the third address, transmit a connection check command for requesting a response from a device having the address, and check that the third address is an unused address by confirming that a response to the transmitted connection check command is not received.

4. The storage systems according to claim 1, wherein the connection check unit is configured to transmit a login request to the second storage system over the migration path and check whether or not a connection over the migration path is possible by confirming whether or not a login response to the transmitted login request is received from the second storage system.

5. The storage systems according to claim 1, wherein the switching-or-not determination unit is configured to determine whether or not a switching of storage system from the first storage system to the second storage system is possible, by determining whether or not the same configuration as the first storage system is configured in the second storage system, based on first invariable information, of the first system information, which is specialized to the first storage system to be unchangeable and second invariable information, of the second system information, which is specialized to the second storage system to be unchangeable.

6. The storage systems according to claim 1, wherein the fail-over information migration unit is configured to copy the ID assigned to the first storage system and the address assigned to the first interface device to ones corresponding to partial fail-over information in the second system information, the partial fail-over information being deleted from the fail-over information; memorize difference information indicative of an updated content of the partial fail-over information; and update a content of the partial fail-over information in the second system information, based on the difference information, after the user data is migrated by the user data migration unit.

7. The storage systems according to claim 1, wherein the user data migration unit is configured to create a copy pair of corresponding logical units between a plurality of first logical units configuring the first user region and a plurality of second logical units configuring the second user region; and copy the user data memorized in the first logical units to the second logical units corresponding to the first logical units by use of a function of the copy pair.

8. The storage systems according to claim 1, wherein the switching execution unit is configured to: designate an address for specifying a communication partner; transmit a connection check command for requesting a response from a device having the address to the second storage system over the migration path; check whether or not a connection over the migration path is possible by confirming whether or not a response to the transmitted connection check command is received from the second storage system; if a connection is determined to be possible in the connection check by the connection check command, assign a second ID which is an ID to have been assigned to the second storage system before the switching execution unit initiates the processing to the first storage system; assign a third address different from both a first address which is an address to have been assigned to the first interface device before the switching execution unit initiates the processing and a second address which is an address to have been assigned to the second interface device before the switching execution unit initiates the processing to the first interface device; assign a first ID which is an ID to have been assigned to the first storage system before the switching execution unit initiates the processing to the second storage system; and assign the first address to the second interface device.

9. The storage systems according to claim 1, wherein, in the first and the second storage systems, the storage devices loaded in advance therein cannot be inserted and extracted and an exchange thereof is performed at a unit of storage system.

10. The storage systems according to claim 1, wherein, when the first and the second interface devices are present in plurality, respectively, the connection check unit is further configured to check whether or not a connection is possible about each of migration paths mutually connecting interface devices to form a pair.

11. The storage systems according to claim 1, wherein the switching-or-not determination unit is further configured to: transmit the first invariable information, of the first system information, which is specialized to the first storage system to be unchangeable to the second storage system; receive a determination result when the second storage system determines whether or not the same configuration as the first storage system is configured in the second storage system, based on the first invariable information received from the first storage system and the second invariable information, of the second system information, which is specialized to the second storage system to be unchangeable, from the second storage system; and determine whether or not a switching of storage system from the first storage system to the second storage system is possible based on the determination result received from the second storage system.

12. The storage systems according to claim 1, wherein the fail-over information migration unit is further configured to transmit the first system information to the second storage system; and copy partial fail-over information which deletes the ID assigned to the first storage system and the address assigned to the first interface device from the fail-over information of the first system information received from the fail-over information migration unit, to one corresponding to the partial fail-over information of the second system information in the second storage system.

13. The storage systems according to claim 1, wherein the first system information comprises first firmware which is loaded in the first storage system; and the second system information comprises second firmware which is loaded in the second storage system, and wherein the fail-over information migration unit is further configured to compare a version of the first firmware and a version of the second firmware; and include the first firmware in the fail-over information for migration to the second storage system, if the version of the second firmware is lower than the version of the first firmware.

14. A switching method of a first storage system to a second storage system, wherein the first storage system comprises:
a first storage device including a first user region which is a storage region accessible from a host and user data accessed from the host is memorized in; and a first system region which is a storage region inaccessible from the host, the first system region memorizing first system information which is information regarding a configuration and a control of the first storage system;
a first interface device connected to a second interface device provided in the second storage system; and
a first controller for controlling a switching of storage system from the first storage system to the second storage system, the second storage system comprises:
a second storage device including a second user region which is a storage region accessible from a host and user data accessed from the host is memorized in;
and a second system region which is a storage region inaccessible from the host, the second system region memorizing second system information which is information regarding a configuration and a control of the second storage system;

wherein the method comprises:
checking whether or not a connection is possible over a migration path which is a path to connect the first interface device to the second interface device;
determining whether or not the switching of storage system from the first storage system to the second storage system is possible, if a connection is determined to be possible;
migrating fail-over information which is a migration target of the first system information to the second storage system over the migration path, if the switching is determined to be possible;
migrating the user data memorized in the first user region to the second storage system over the migration path, after the fail-over information is migrated; and
enabling the second storage system to receive I/O from the host after the user data is migrated,
wherein the checking step includes transmitting a login request to the second storage system over the migration path and checking whether or not a connection over the migration path is possible by confirming whether or not a login response to the transmitted login request is received from the second storage system; and
wherein the enabling step includes designating an address for specifying a communication partner; transmitting a connection check command for requesting a response from a device having the address to the second storage system over the migration path; checking whether or not a connection over the migration path is possible by confirming whether or not a response to the transmitted connection check command is received from the second storage system; if a connection is determined to be possible in the connection check by the connection check command, assigning a second ID which is an ID to have been assigned to the second storage system before the enabling step initiates the processing to the first storage system; assigning a third address different from both a first address which is an address to have been assigned to the first interface device before the enabling step initiates the processing and a second address which is an address to have been assigned to the second interface device before the enabling step initiates the processing to the first interface device; assigning a first ID which is an ID to have been assigned to the first storage system before the enabling step initiates the processing to the second storage system; and assigning the first address to the second interface device.

15. Storage systems including a first storage system and a second storage system connected to the first storage system, the second storage system comprising: a second storage device including a second user region which is a storage region accessible from a host and user data accessed from the host is memorized in; and a second system region which is a storage region inaccessible from the host, the second system region memorizing second system information which is information regarding a configuration and a control of the second storage system, wherein, the first storage system comprises:
a first storage device including a first user region which is a storage region accessible from the host and user data accessed from the host is memorized in; and a first system region which is a storage region inaccessible from the host, the first system region memorizing first system information which is information regarding a configuration and a control of the first storage system;
a first interface device connected to a second interface device which the second storage system has; and
a first controller for controlling a switching of storage system of the first storage system to the second storage system,
wherein the first controller comprises:
a connection check unit configured to check whether or not a connection is possible over a migration path which is a path to connect the first interface device to the second interface device;
a switching-or-not determination unit configured to determine whether or not the switching of storage system from the first storage system to the second storage system is possible, if a connection is determined to be possible by the connection check unit;
a fail-over information migration unit configured to migrate fail-over information which is a migration target of the first system information to the second storage system over the migration path, if the switching is determined to be possible by the switching-or-not determination unit;
a user data migration unit configured to migrate the user data memorized in the first user region to the second storage system over the migration path, after the fail-over information is migrated by the fail-over information migration unit; and
a switching execution unit configured to enable the second storage system to receive I/O from the host after the user data is migrated by the user data migration unit,
wherein the connection check unit is configured to transmit a login request to the second storage system over the migration path and check whether or not a connection over the migration path is possible by confirming whether or not a login response to the transmitted login request is received from the second storage system.

* * * * *